US009111004B2

(12) United States Patent
Carrato et al.

(10) Patent No.: US 9,111,004 B2
(45) Date of Patent: *Aug. 18, 2015

(54) TEMPORAL SCOPE TRANSLATION OF META-MODELS USING SEMANTIC WEB TECHNOLOGIES

(75) Inventors: Anthony L. Carrato, New Milford, CT (US); Peter A. Coldicott, Jonestown, TX (US); Raymond W. Ellis, Austin, TX (US); Richard A. Hopkins, Cleveland (GB); Brad N. Jones, London (GB); Edward E. Kelley, Wappingers Falls, NY (US); Eoin Lane, Littleton, MA (US); Ian J. Scott, West Yorkshire (GB); Franciscus J. van Ham, Geldrop (NL); Anthony J. Young-Garder, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/018,909

(22) Filed: Feb. 1, 2011

(65) Prior Publication Data

US 2011/0153610 A1    Jun. 23, 2011

Related U.S. Application Data

(63) Continuation-in-part of application No. 12/640,697, filed on Dec. 17, 2009, now Pat. No. 8,244,768.

(51) Int. Cl.
*G06F 17/30* (2006.01)
*G06F 7/00* (2006.01)
*G06F 17/22* (2006.01)

(52) U.S. Cl.
CPC ........ *G06F 17/3089* (2013.01); *G06F 17/2264* (2013.01)

(58) Field of Classification Search
CPC .......... G06F 17/3089; G06F 17/30943; G06F 17/2264

USPC ................................... 707/792, 803
See application file for complete search history.

(56) References Cited

U.S. PATENT DOCUMENTS 5,970,490 A    10/1999  Morgenstern
6,169,992 B1    1/2001  Beall et al.
(Continued)

FOREIGN PATENT DOCUMENTS

JP    2006215753    8/2006
WO    2007113164    10/2007

OTHER PUBLICATIONS

Maicher et al.("Temporal Qualification in Topic Maps", Fifth International Conference on Topic Maps Research and Applications, TMRA 2009 Leipzig, Germany, Nov. 12-13, 2009.*
(Continued)

*Primary Examiner* — Shew-Fen Lin
(74) *Attorney, Agent, or Firm* — Brown & Michaels, PC; Mark Vallone

(57) ABSTRACT

Implementation of a meta-model service of a service oriented architecture industry model repository into a web ontology language representation of at least one topic map meta-model into a plurality of temporal scope topic map meta-models representing states of the at least one topic map meta-model at different times. The implementation includes assigning topics, occurrences, and attributes from the meta-model service to the at least one topic map meta-model. The topics, occurrences, and attributes are assigned from the at least one topic map meta-model to plurality of temporal scope topic map meta-models. The topics, occurrences, and attributes from the plurality of temporal scope topic map meta-models are converted into resource description framework triples; and the resource description framework triples are persisted into the resource description framework repository.

23 Claims, 16 Drawing Sheets

(56) References Cited

U.S. PATENT DOCUMENTS

| | | | |
|---|---|---|---|
| 6,256,773 B1 | 7/2001 | Bowman-Amuah | |
| 6,292,932 B1 | 9/2001 | Baisley et al. | |
| 6,300,947 B1 | 10/2001 | Kanevsky | |
| 6,363,353 B1 | 3/2002 | Chen | |
| 6,377,934 B1 | 4/2002 | Chen et al. | |
| 6,381,743 B1 | 4/2002 | Mutschler, III | |
| 6,411,961 B1 | 6/2002 | Chen | |
| 6,539,396 B1 | 3/2003 | Bowman-Amuah | |
| 6,658,644 B1 | 12/2003 | Bishop et al. | |
| 6,684,386 B1 | 1/2004 | Baisley | |
| 6,789,252 B1 | 9/2004 | Burke et al. | |
| 6,799,174 B2 | 9/2004 | Chipman et al. | |
| 7,080,064 B2 | 7/2006 | Sundaresan | |
| 7,099,859 B2 | 8/2006 | Sundaresan | |
| 7,103,871 B1 | 9/2006 | Kirkpatrick et al. | |
| 7,225,241 B2 | 5/2007 | Yada | |
| 7,284,196 B2 | 10/2007 | Skeen et al. | |
| 7,313,575 B2 | 12/2007 | Carr et al. | |
| 7,318,055 B2 | 1/2008 | Britton | |
| 7,366,706 B2 | 4/2008 | Chang et al. | |
| 7,412,457 B2 | 8/2008 | Saracco et al. | |
| 7,428,582 B2 | 9/2008 | Bean et al. | |
| 7,483,973 B2 | 1/2009 | An et al. | |
| 7,526,501 B2 | 4/2009 | Albahari et al. | |
| 7,546,295 B2 | 6/2009 | Brave et al. | |
| 7,630,877 B2 | 12/2009 | Brown et al. | |
| 7,698,398 B1 | 4/2010 | Lai | |
| 7,711,836 B2 | 5/2010 | Videlov et al. | |
| 7,716,279 B2 | 5/2010 | Savchenko et al. | |
| 7,761,406 B2 | 7/2010 | Harken | |
| 7,761,533 B2 | 7/2010 | Angelov | |
| 7,769,877 B2 | 8/2010 | McBride et al. | |
| 7,792,868 B2 | 9/2010 | Finkelstein et al. | |
| 7,865,820 B2 | 1/2011 | Sauer et al. | |
| 7,890,517 B2 | 2/2011 | Angelo et al. | |
| 7,979,840 B2 | 7/2011 | Zhang et al. | |
| 7,987,163 B2 | 7/2011 | Keshavarz-Nia et al. | |
| 8,001,129 B2 | 8/2011 | Arumainayagam et al. | |
| 8,010,947 B2 | 8/2011 | Carbone et al. | |
| 8,015,541 B1 | 9/2011 | Srinivasan et al. | |
| 8,024,425 B2 | 9/2011 | Stoyanova | |
| 8,074,117 B2 | 12/2011 | Wolf et al. | |
| 8,156,179 B2 | 4/2012 | Parmar et al. | |
| 8,229,881 B2 | 7/2012 | Pedro et al. | |
| 8,234,387 B2 | 7/2012 | Bradley et al. | |
| 8,301,490 B2 | 10/2012 | Cornford | |
| 8,341,155 B2 | 12/2012 | Lane | |
| 8,346,929 B1 | 1/2013 | Lai | |
| 8,631,072 B2 | 1/2014 | Damola et al. | |
| 2002/0059566 A1* | 5/2002 | Delcambre et al. | 717/146 |
| 2002/0069102 A1 | 6/2002 | Vellante et al. | |
| 2002/0073106 A1 | 6/2002 | Parker et al. | |
| 2002/0087315 A1 | 7/2002 | Lee et al. | |
| 2002/0116389 A1 | 8/2002 | Chen et al. | |
| 2002/0129329 A1 | 9/2002 | Nishioka et al. | |
| 2002/0194053 A1 | 12/2002 | Barrett et al. | |
| 2003/0009740 A1 | 1/2003 | Lan | |
| 2003/0110467 A1 | 6/2003 | Balakrishnan | |
| 2003/0135825 A1 | 7/2003 | Gertner et al. | |
| 2003/0158851 A1* | 8/2003 | Britton et al. | 707/100 |
| 2003/0172368 A1 | 9/2003 | Alumbaugh et al. | |
| 2003/0177481 A1 | 9/2003 | Amaru et al. | |
| 2003/0229529 A1 | 12/2003 | Mui et al. | |
| 2003/0233339 A1 | 12/2003 | Downs | |
| 2003/0233631 A1 | 12/2003 | Curry et al. | |
| 2004/0010484 A1 | 1/2004 | Foulger et al. | |
| 2004/0107118 A1 | 6/2004 | Harnsberger et al. | |
| 2004/0158815 A1 | 8/2004 | Potgieter | |
| 2004/0172612 A1 | 9/2004 | Kasravi et al. | |
| 2004/0193476 A1 | 9/2004 | Aerdts | |
| 2005/0044197 A1 | 2/2005 | Lai | |
| 2005/0050311 A1 | 3/2005 | Joseph et al. | |
| 2005/0050549 A1 | 3/2005 | Joseph et al. | |
| 2005/0114829 A1 | 5/2005 | Robin et al. | |
| 2005/0138113 A1 | 6/2005 | Brendle et al. | |
| 2005/0154662 A1 | 7/2005 | Langenwalter | |
| 2005/0154769 A1 | 7/2005 | Eckart et al. | |
| 2005/0166178 A1 | 7/2005 | Masticola et al. | |
| 2005/0182744 A1 | 8/2005 | Kawabata et al. | |
| 2005/0262191 A1 | 11/2005 | Mamou et al. | |
| 2005/0268326 A1 | 12/2005 | Bhargavan et al. | |
| 2005/0278202 A1 | 12/2005 | Broomhall et al. | |
| 2006/0004774 A1 | 1/2006 | Alcorn | |
| 2006/0015489 A1 | 1/2006 | Probst et al. | |
| 2006/0047810 A1 | 3/2006 | Herzog et al. | |
| 2006/0053174 A1 | 3/2006 | Gardner et al. | |
| 2006/0070083 A1 | 3/2006 | Brunswig et al. | |
| 2006/0074980 A1 | 4/2006 | Sarkar | |
| 2006/0085750 A1 | 4/2006 | Easton, Jr. et al. | |
| 2006/0106804 A1 | 5/2006 | Chande | |
| 2006/0106824 A1 | 5/2006 | Stuhec | |
| 2006/0129440 A1 | 6/2006 | Frauenhoffer et al. | |
| 2006/0206883 A1 | 9/2006 | Sabbouh | |
| 2006/0229896 A1 | 10/2006 | Rosen et al. | |
| 2006/0236307 A1 | 10/2006 | Debruin et al. | |
| 2006/0241931 A1 | 10/2006 | Abu el Ata et al. | |
| 2006/0274222 A1 | 12/2006 | Shu | |
| 2007/0038610 A1 | 2/2007 | Omoigui | |
| 2007/0043632 A1 | 2/2007 | Abelow | |
| 2007/0073663 A1 | 3/2007 | McVeigh et al. | |
| 2007/0088683 A1 | 4/2007 | Feroglia et al. | |
| 2007/0094219 A1 | 4/2007 | Kipersztok | |
| 2007/0106629 A1 | 5/2007 | Endacott et al. | |
| 2007/0112712 A1 | 5/2007 | Flinn et al. | |
| 2007/0112803 A1 | 5/2007 | Pettovello | |
| 2007/0156726 A1 | 7/2007 | Levy | |
| 2007/0168479 A1 | 7/2007 | Bean et al. | |
| 2007/0179983 A1 | 8/2007 | Putman | |
| 2007/0233681 A1 | 10/2007 | Ronen et al. | |
| 2007/0239768 A1 | 10/2007 | Quinn-Jacobs | |
| 2007/0260476 A1 | 11/2007 | Smolen et al. | |
| 2007/0261027 A1 | 11/2007 | Dhanakshirur et al. | |
| 2007/0271277 A1* | 11/2007 | Ivan et al. | 707/100 |
| 2008/0052314 A1 | 2/2008 | Batabyal | |
| 2008/0059630 A1 | 3/2008 | Sattler et al. | |
| 2008/0091283 A1 | 4/2008 | Balci et al. | |
| 2008/0091448 A1 | 4/2008 | Niheu et al. | |
| 2008/0114700 A1 | 5/2008 | Moore et al. | |
| 2008/0126397 A1* | 5/2008 | Alexander et al. | 707/102 |
| 2008/0127047 A1 | 5/2008 | Zhang et al. | |
| 2008/0133558 A1 | 6/2008 | Carlson et al. | |
| 2008/0134137 A1 | 6/2008 | Petersen | |
| 2008/0178147 A1 | 7/2008 | Meliksetian et al. | |
| 2008/0215358 A1 | 9/2008 | Goldszmidt et al. | |
| 2008/0215400 A1 | 9/2008 | Ban et al. | |
| 2008/0229195 A1 | 9/2008 | Brauel et al. | |
| 2008/0235664 A1 | 9/2008 | Carbone et al. | |
| 2008/0255892 A1 | 10/2008 | Orangi et al. | |
| 2008/0270372 A1 | 10/2008 | Hsu et al. | |
| 2008/0288944 A1 | 11/2008 | Coqueret et al. | |
| 2008/0313282 A1 | 12/2008 | Warila et al. | |
| 2008/0319947 A1 | 12/2008 | Latzina et al. | |
| 2009/0018996 A1 | 1/2009 | Hunt et al. | |
| 2009/0063522 A1 | 3/2009 | Fay et al. | |
| 2009/0064087 A1 | 3/2009 | Isom | |
| 2009/0077043 A1 | 3/2009 | Chang et al. | |
| 2009/0077124 A1 | 3/2009 | Spivack et al. | |
| 2009/0089078 A1 | 4/2009 | Bursey | |
| 2009/0094112 A1 | 4/2009 | Cesarini et al. | |
| 2009/0106234 A1 | 4/2009 | Siedlecki et al. | |
| 2009/0109225 A1 | 4/2009 | Srivastava et al. | |
| 2009/0112908 A1 | 4/2009 | Wintel et al. | |
| 2009/0132211 A1 | 5/2009 | Lane et al. | |
| 2009/0138293 A1 | 5/2009 | Lane et al. | |
| 2009/0150860 A1 | 6/2009 | Gschwind et al. | |
| 2009/0150981 A1 | 6/2009 | Amies et al. | |
| 2009/0157630 A1 | 6/2009 | Yuan | |
| 2009/0157801 A1 | 6/2009 | Barber et al. | |
| 2009/0158237 A1 | 6/2009 | Zhang et al. | |
| 2009/0182610 A1 | 7/2009 | Palanisamy et al. | |
| 2009/0182750 A1 | 7/2009 | Keyes et al. | |
| 2009/0193057 A1 | 7/2009 | Maes | |
| 2009/0193432 A1 | 7/2009 | McKegney et al. | |
| 2009/0201917 A1 | 8/2009 | Maes et al. | |

(56) References Cited

U.S. PATENT DOCUMENTS

| | | | |
|---|---|---|---|
| 2009/0204467 | A1 | 8/2009 | Rubio et al. |
| 2009/0204662 | A1 | 8/2009 | Meo |
| 2009/0210390 | A1 | 8/2009 | Lane |
| 2009/0228425 | A1 | 9/2009 | Goraya |
| 2009/0248705 | A1* | 10/2009 | Ivan et al. ............ 707/100 |
| 2009/0254572 | A1 | 10/2009 | Redlich et al. |
| 2009/0254876 | A1 | 10/2009 | Kuriakose et al. |
| 2009/0281996 | A1 | 11/2009 | Liu et al. |
| 2009/0313335 | A1 | 12/2009 | Heidasch |
| 2009/0319981 | A1 | 12/2009 | Akkiraju et al. |
| 2010/0057677 | A1 | 3/2010 | Rapp et al. |
| 2010/0058113 | A1 | 3/2010 | Rapp et al. |
| 2010/0077386 | A1 | 3/2010 | Akkiraju et al. |
| 2010/0082387 | A1 | 4/2010 | Cao et al. |
| 2010/0106656 | A1 | 4/2010 | Sheth et al. |
| 2010/0145774 | A1 | 6/2010 | Veshnyakov et al. |
| 2010/0146617 | A1 | 6/2010 | Betts et al. |
| 2010/0153094 | A1 | 6/2010 | Lee et al. |
| 2010/0161629 | A1 | 6/2010 | Palanisamy et al. |
| 2010/0174693 | A1 | 7/2010 | Chandrasekhara et al. |
| 2010/0228693 | A1 | 9/2010 | Dawson et al. |
| 2010/0250497 | A1 | 9/2010 | Redlich et al. |
| 2010/0269099 | A1 | 10/2010 | Yoshimura et al. |
| 2010/0312731 | A1 | 12/2010 | Knoblauch |
| 2011/0035391 | A1* | 2/2011 | Werner et al. ............ 707/756 |
| 2011/0099050 | A1 | 4/2011 | Coldicott et al. |
| 2011/0099139 | A1 | 4/2011 | Coldicott et al. |
| 2011/0099207 | A1 | 4/2011 | Brown et al. |
| 2011/0099536 | A1 | 4/2011 | Coldicott et al. |
| 2011/0153292 | A1 | 6/2011 | Lane et al. |
| 2011/0153293 | A1 | 6/2011 | Coldicott et al. |
| 2011/0153608 | A1 | 6/2011 | Lane et al. |
| 2011/0153610 | A1 | 6/2011 | Carrato et al. |
| 2011/0153636 | A1 | 6/2011 | Coldicott et al. |
| 2011/0153767 | A1 | 6/2011 | Coldicott et al. |
| 2011/0202326 | A1 | 8/2011 | Salemann |
| 2011/0238610 | A1 | 9/2011 | Lee et al. |
| 2012/0023042 | A1 | 1/2012 | Das |

OTHER PUBLICATIONS

Stefanova et al. "Viewing and Querying Topic Maps in terms of RDF", SeMMA 2008 CEUR Workshop Proceedings, ISSN 1613-0073, online at CEUR-WS.org/Vol-346/.*
Chen, D-W. et al.; "A P2P based Web service discovery mechanism with bounding deployment and publication"; Chinese Journal of Computers; vol. 28; No. 4; pp. 615-626; Apr. 2005.
Lee, J. et al.; "Semantic and Dynamic Web Service of SOA bsed Smart Robots using Web 2.0 Open API", 2008; Sixth International Conference on Software Engineering, Research, Management, and Application; pp. 255-260.
Demirkan, H. et al.; "Service-oriented technology and management: Perspectives on research and practice for the coming decade"; Electronic Commerce Research and Applications vol. 7 Issue 4; Jan. 2008; pp. 356-376.
Zdun, U. et al.; "Modeling Process-Driven and Service-Oriented Architectures Using Patterns and Pattern Primitives"; ACM Transactions on the Web; vol. 1 No. 3 Article 14; Sep. 2007; 44 pages.
Simoes, B. et al.; "Enterprise-level Architecture for Interactive Web-based 3D Visualization of Geo-referenced Repositories"; Association for Computing Machinery Inc. 978-1-60558-432-4/09/0006; Jun. 2009; pp. 147-154.
Kanakalata et al; Performance Opitimization of SOA based AJAX Application; 2009; pp. 89-93.
Annett et al.; "Building Highly-Interactive, Data-Intensive, REST Applications: The Invenio Experience"; 2008; pp. 1-15.
Arnold et al.; "Automatic Realization of SOA Deployment Patterns in Distributed Environments"; ICSOC 2008; LNCS 5364; 2008; pp. 162-179.
R. Hopkins et al.; "Eating the IT Elephant: Moving from Greenfield Development to Brownfield"; Chapter 6; 23 pages.

Pu et al; Combining MDE and UML to Reverse Engineer Web-Based Legacy System; IEEE; 2008; pp: 718-725.
R. Barrett; "Model Driven Design of Distribution Patterns for Web Service Compositions" ; 2006; School of Computing; 4 pages.
Gamatie et al.; "Operational Semantics of the Marte Repetitive Structure Modeling Concepts for Data-Parallel Applications Design", 2010 Ninth International Symposium on Parallel and Distributed Computing; IEEE; 2010 pp. 25-32.
Smeda et al.; "Cosastudio: A Software Architecture Modeling Tool", World Academy of Science, Engineering, and Technology; 2009; pp. 263-266.
Moroff et al. "OpenArchitectureWare 4.1 RSM/RSA Adapter" www.openarchitecture.org 2009-2010; pp. 1-7.
Volzer, Hagen, et al. "A tool for subsystem configuration management." Software Maintenance, 2002. Proceedings. International Conference on. IEEE, 2002.
Sadiq, Shazia, and Maria Orlowska. "Architectural considerations in systems supporting dynamic workflow modification." Proceedings of the workshop on Software Architectures for Business Process Management at CAiSE. vol. 99. 1999.
Sadiq, Wasim, and Maria E. Orlowska. "Analyzing process models using graph reduction techniques." Information systems 25.2: 117-134 (2000).
Sadiq, Wasim, and Maria E. Orlowska. "Applying graph reduction techniques for identifying structural conflicts in process models." Advanced Information Systems Engineering. Springer Berlin Heidelberg, 1999.
Knodel. "Preparing the Organizational 'Soil' for Measurable and Sustainable change: Business Value Management and Project Governance." Journal of Change Management, vol. 4, No. 1, 45-62, Mar. 2004 (Received Jun. 2003).
Prosci's Change Management Maturity Model Prosci 2004.
Clarke "The Development of a Best Practice Model for Change Management." European Management Journal vol. 15, No. S, pp. 537-545, 1997.
Larsen. "Building SOA applications with reusable assets, Part 1: Reusable assets, recipes, and patterns." http://www.microsoflttranslator.com/BV.aspx?ref=IE8Activity&a=hllp%3A%2F%2Fwww.ibm.com%2Fdeveloperworks%2Fcn%2Fwebservices%2Fws-soa-reuse1 %2./ 2006.
Larsen. "Building SOA applications with reusable assets, Part 2: SOA recipe reference examples", http://www.microsoflttranslator.com/BV.aspx?ref=IE8Activity&a=hllp%3A%2F%2Fwww.ibm.com%2Fdeveloperworks%2Fcn%2Fwebservices%2Fws-soa-reuse2%2F. 2006.
Larsen. "Building SOA applications with reusable assets, Part 3: WS response template mode." http://www.microsoflttranslator.com/BV.aspx?ref=IE8Activity&a=http%3A%2%2Fwww.ibm.com%2Fdeveloperworks%2Fcn%2Fwebservices%2Fws-soa-reuse3 %2 F. 2007.
Ponnalagu "System and Method for Distributed Web Service Adaptation using Aspect oriented Programming", IBM Technical Disclosure Bulletin, Sep. 15, 2008, pp. 1-3.
Baum et al., "Mapping Requirements to Reusable Components using Design Spaces", 2000, Proceedings 4th International Conference on Requirements Engineering, pp. 159-167.
Hsiung et al., "Vert AF: An Application Framework for the Design and Verification of Embedded Real-Time Software", IEEE Transactions on Software Engineering, vol. 30, No. 10, Oct. 2004, pp. 656-674.
Robinson et al., "Finding Reusable UML Sequence Diagrams Automatically", IEE Software, 2004, pp. 60-67 ~.
Jin et al., "Automated Requirements Elicitation: Combining a Model-Driven Approach with Concept Reuse", International Journal of Software Engineering and Knowledge Engineering, vol. 13, No. 1, 2003, pp. 53-82.
Justin Kelleher, "A Reusable Traceability Framework Using Patterns", University of Cape Town, ACM Digital Library, 2005, pp. 50-55.
Sharples et al., "The Design and Implementation of a Mobile Learning Resource", Educational Technology Research Group, University of Birmingham, ACM Digital Library, 2002, pp. 1-23.

(56) References Cited

OTHER PUBLICATIONS

Min Luo, "Tutorial 1: Common Business Components and Services Toward More Agile and Flexible Industry Solutions and Assets", 2008 IEEE Congress on Services Part II, pp. 11-12.
Ying Huang et al., "A Stochastic Service Composition Model for Business Integration", Proceeds of the International Conference on Next Generation Web Services Practices, 2005 IEEE Computer Society, pp. 1-8.
Pham et al., "Analysis of Visualisation Requirements for Fuzzy Systems", 2003 ACM, pp. 181-187.
van den Heuvel, Willem-Jan, Mike Papazoglou, and Manfred A. Jeusfeld. "Configuring business objects from legacy systems." Advanced Information Systems Engineering. Springer Berlin Heidelberg, 1999.
Ryan, Kevin, and Brian Mathews. "Matching conceptual graphs as an aid to requirements re-use." Requirements Engineering, 1993., Proceedings of IEEE International Symposium on. IEEE, 1993.
Wilde, Norman, et al. "A comparison of methods for locating features in legacy software." Journal of Systems and Software 65.2 (2003): 105-114.
Heckel, Reiko, et al. "Architectural transformations: From legacy to three-tier and services." Software Evolution. Springer Berlin Heidelberg, 2008. 139-170.
Papazoglou, Mike P., and Willem-Jan van den Heuvel. "Configurable business objects for building evolving enterprise models and applications." Business Process Management. Springer Berlin Heidelberg, 2000. 328-344.
Pepper, Steve. "The TAO of topic maps." Proceedings of XML Europe. vol. 3. 2000.
Le Grand, Benedicte, and Michel Soto. "Visualisation of the semantic web: Topic Maps Visualisation." Information Visualisation, 2002. Proceedings. Sixth International Conference on. IEEE, 2002.
Bailey J. "Web and Semantic Web Query Languages: A Survey." Lecture Notes in Computer Science, vol. 3564 (2005), pp. 35-133, 2005.
A. Rauschmayer and P. Renner. Knowledge-Representation-Based Software Engineering, Technical Report 0407, Ludwig-Maximilians-Universitat Munchen, Institut fur Informatik, May 2004.
Chapter 3. Integration Services; Enterprise Knowledge Infrastructures; 2005, 147-224, DOI: 10.1007/3-540-27514-2_3; pp. 147-224.
IBM: Best Practices for SAP Business Information Warehouse on DB2 UDB for z/OS VS; ibm redbooks; May 2005; pp. 1-286.
Hatzigaidas, Athanasios, et al. "Topic Map Existing Tools: A Brief Review." ICTAMI 2004 (International Conference on Theory and Applications of Mathematics and Informatics). 2004.
Ahmed et al., An Introduction to Topic Maps, Jul. 2005, pp. 1-15.
The Moose Book: Subject, model, meta-model, meta-meta-model, http://www.themoosebook.org/book/internals/fame/subjectmodel-meta-model, Copyright 2010-2011, pp. 1-3.
Dinesh et al., Oracle® Enterprise Repository, User Guide, 1 Og Release 3 (10.3), Jul. 2009, Oracle Corporation, pp. 5, 7, 10-11, 18-19, 21, 37-38, 61, 71, 77, 82, 84.
Oracle® Enterprise Repository Harvester User Guide, 1 Og Release 3 (10.3), Jul. 2009, Oracle Corporation, pp. 1-1 to 3-14.
Tuohy et al.Topic Maps and TEI—Using Topic Maps as a Tool for Presenting TEI Documents, Oct. 18, 2007, pp. 1-13.
Bieberstein, Norbert, Robert G. Laird, and Keith Jones. Executing SOA: a practical guide for the service-oriented architect. IBM Press, 2008.
List of related applications. Jul. 7, 2014.
Sam Hunting et al. "XML topic-maps: creating and using topic maps for the Web", Jul. 16, 2002.
Cerny, R. "A RESTful Web Service Interface for Topic Maps." Topincs; 8 pages; 2006.
W3Schools.com. "XPath Syntax". https://web.archive.org/web/20104190123 16/http://www.w3schools.com/xpath/xpath_syntax.asp; Apr. 2010.
Blank-Edelman, D. "The 10-Minute XPath Tutorial—Automating System Administration with Perl." http://web.archive.org/web/20110421043126/http://www.oreillynet.com/pub/a/perl/excerpts/system-admin-with-perl/ten-minute-xpath-utorial.html, 2011.
Zhang, S. et al. "Adding Valid Time to XPath." In Proceedings of the Second International Workshop on Databases in Networked Information Systems (DNIS '02); Subhash Bhalla (Ed); Springer-Verlag, London, UK, UK, pp. 29-42; 2002.
U.S. Appl. No. 11/944,946; Final Rejection dated May 14, 2012; Non-Final Rejection dated Nov. 2, 2011 and Non-Final Rejection dated Jun. 10, 2011.
U.S. Appl. No. 12/640,624; Notice of Allowance dated Feb. 28, 2014; Final Rejection dated Aug. 29, 2013; Non-Final Rejection dated Feb. 8, 2013; Non Final Rejection dated May 7, 2012; Non-Final Rejection dated Oct. 11, 2011.
U.S. Appl. No. 12/640,697; Notice of Allowance dated Mar. 30, 2012 and Non-Final Rejection dated Oct. 5, 2011.
U.S. Appl. No. 13/533,007; Non-Final Rejection dated Feb. 6, 2015; Final Rejection dated May 23, 2014; Non-Final Rejection dated Sep. 6, 2013.
U.S. Appl. No. 12/605,635; Final Rejection dated Oct. 10, 2013 and Non-Final Rejection dated Dec. 20, 2012.
U.S. Appl. No. 12/604,751; Notice of Allowance dated Aug. 2, 2013 and Non-Final Rejection dated Dec. 6, 2012.
U.S. Appl. No. 13/011,260; Notice of Allowance dated Aug. 13, 2012 and Non-Final Rejection dated Dec. 8, 2011.
U.S. Appl. No. 12/640,749; Notice of Allowance dated Jun. 13, 2013; Final Rejection dated Jun. 27, 2012; Non-Final Rejection dated Dec. 21, 2011.
U.S. Appl. No. 12/605,660; Notice of Allowance dated Sep. 27, 2013; Final Rejection dated Nov. 7, 2012 and Non-Final Rejection dated Dec. 16, 2011.
U.S. Appl. No. 12/605,562; Notice of Allowance dated Dec. 31, 2013; Non-Final Rejection dated Jun. 5, 2013 and Non-Final Rejection dated Dec. 6, 2012.
U.S. Appl. No. 12/640,852; Notice of Allowance dated Dec. 24, 2014; Notice of Allowance dated Sep. 12, 2014; and Non-Final Rejection dated Sep. 17, 2012.
U.S. Appl. No. 12/640,865; Notice of Allowance dated Sep. 3, 2013 and Non-Final Rejection dated Oct. 11, 2012.
Kreger, H. "Navigating the SOA Open Standards Landscape Around Architecture." The Open Group, Jul. 2009.
U.S. Appl. No. 11/942,191; Non-Final Rejection dated Mar. 4, 2011.
U.S. Appl. No. 12/034,508; Final Rejection dated Jan. 6, 2011 and Non-Final Rejection dated Apr. 19, 2010.

* cited by examiner

Fig. 13

Explore from here http://www.owl-ontologies.com/unnamed.owl#Association
http://www.owl-ontologies.com/unnamed.owl#AssociationRole
http://www.owl-ontologies.com/unnamed.owl#AssociationType
http://www.owl-ontologies.com/unnamed.owl#Occurrence
http://www.owl-ontologies.com/unnamed.owl#OccurrenceType
http://www.owl-ontologies.com/unnamed.owl#Topic
http://www.owl-ontologies.com/unnamed.owl#TopicMap
http://www.owl-ontologies.com/unnamed.owl#TopicName

Fig. 14

Statements with this resource as object

| Subject: | Predicate: | Object: |
|---|---|---|
| http://www.ibm.com/imr#1is an | http://www.w3.org/1999/02/22-rdf-syntax-ns#type | this |
| http://www.ibm.com/imr#deploy | http://www.w3.org/1999/02/22-rdf-syntax-ns#type | this |
| http://www.ibm.com/imr#use | http://www.w3.org/1999/02/22-rdf-syntax-ns#type | this |
| http://www.ibm.com/imr#offers | http://www.w3.org/1999/02/22-rdf-syntax-ns#type | this |

Fig. 15

| Subject: | Predicate: | Object: |
|---|---|---|
| http://www.ibm.com/imr#1_offers_3 | http://www.ibm.com/imr#type | this |
| http://www.ibm.com/imr#1_offers_5 | http://www.ibm.com/imr#type | this |

Fig. 16

Explore Resource: http://www.ibm.com/imr#1_offers_3

Explore from here

Statements with this resource as subject

| Subject: | Predicate: | Object: |
|---|---|---|
| this | http://www.w3.org/1999/02/22-rdf-syntax-ns#type | http://www.owl-ontologies.com/unnamed.owl#Association |
| this | http://www.owl-ontologies.com/unnamed.owl#hasScope | http://www.ibm.com/imr#the customer |
| this | http://www.owl-ontologies.com/unnamed.owl#hasScope | http://www.ibm.com/imr#temporalscopea |
| this | http://www.ibm.com/imr#belongsToTopicMap | http://www.ibm.com/imr/IMR Topic Map |
| this | http://www.owl-ontologies.com/unnamed.owl#hasRole | http://www.ibm.com/imr#1 plays the role of a offered |
| this | http://www.owl-ontologies.com/unnamed.owl#hasRole | http://www.ibm.com/imr#3 plays the role of a offer |
| this | http://www.ibm.com/imr#type | http://www.ibm.com/imr#offers |

Fig. 17

Explore Resource: http://www.ibm.com/imr#1_offers_5

Explore from here

Statements with this resource as subject

| Subject: | Predicate: | Object: |
|---|---|---|
| this | http://www.w3.org/1999/02/22-rdf-syntax-ns#type | http://www.owl-ontologies.com/unnamed.owl#Association |
| this | http://www.owl-ontologies.com/unnamed.owl#hasScope | http://www.ibm.com/imr#the customer |
| this | http://www.owl-ontologies.com/unnamed.owl#hasScope | http://www.ibm.com/imr#temporalscopeb |
| this | http://www.ibm.com/imr#belongsToTopicMap | http://www.ibm.com/imr#IMR Topic Map |
| this | http://www.owl-ontologies.com/unnamed.owl#hasRole | http://www.ibm.com/imr#1 plays the role of a offered |
| this | http://www.owl-ontologies.com/unnamed.owl#hasRole | http://www.ibm.com/imr#3 plays the role of a offer |
| this | http://www.ibm.com/imr#type | http://www.ibm.com/imr#offers |

TEMPORAL SCOPE TRANSLATION OF META-MODELS USING SEMANTIC WEB TECHNOLOGIES

CROSS-REFERENCE TO RELATED APPLICATIONS

This application is a continuation-in-part of parent patent application Ser. No. 12/640,697, filed Dec. 17, 2009, entitled, "IMPLEMENTING SERVICE ORIENTED ARCHITECTURE INDUSTRY MODEL REPOSITORY USING SEMANTIC WEB TECHNOLOGIES".

BACKGROUND

The present invention relates to meta-models, and more specifically to temporal scope translation of customer relationship management using semantic web technologies.

Most customers have complex legacy application environments. Legacy application environments are all of the applications and programs that the customer depends on for their day to day operations. The ability to model the complex legacy environments is helpful for service oriented architecture (SOA) engagement.

Many meta-models that can model the complex legacy application environments define a holistic, end-to end and abstract-to detail picture of an existing business or information technology solution, including data for the past and present states where relevant transformation of informational at levels of abstraction took place. Therefore, the meta-model has time modeled as part of the meta-model.

SUMMARY

According to one embodiment of the present invention, a method for implementing topic map meta-models of a service oriented architecture (SOA) industry model repository (IMR) is provided comprising a meta-model service associated with a physical asset repository. The meta-model service includes at least one topic map meta-model included within an information model repository common meta-meta-model, and the information model repository common meta-meta-model included within a meta-meta-meta-model with a topic map based index. The method comprises a computer assigning topics, occurrences, and attributes from the meta-model service to the at least one topic map meta-model; the computer assigning the topics, occurrences and attributes from the at least one topic map meta-model to a plurality of temporal scope topic map meta-models, wherein a first temporal scope topic map meta-model represents a state of the at least one topic map meta-model at a first time, and wherein a second temporal scope topic map meta-model of the plurality of temporal scope topic map meta-models represents a state of the at least one topic map meta-model at a second time; the computer converting the topics, occurrences, and attributes from the plurality of temporal scope topic map meta-models into resource description framework triples; and the computer persisting the resource description framework triples into a resource description framework repository.

According to another embodiment of the present invention, a computer program product for implementing a meta-model service of a service oriented architecture industry model repository into a web ontology language representation of at least one topic map meta-model specific to temporal scope. The computer product comprises one or more computer-readable tangible storage devices; program instructions, stored on at least one of the one or more storage devices, to assign topics, occurrences, and attributes from the meta-model service to the at least one topic map meta-model; program instructions, stored on at least one of the one or more storage devices, to assign topics, occurrences, and attributes from the at least one topic map meta-model to a plurality of temporal scope topic map meta-models, wherein a first temporal scope topic map meta-model of the plurality of temporal scope topic map meta-models represents a state of the at least one topic map meta-model at a first time and wherein a second temporal scope topic map meta-model of the plurality of temporal scope topic map meta-models represents a state of the at least one topic map meta-model at a second time; program instructions, stored on at least one of the one or more storage devices, to convert the topics, occurrences, and attributes from the plurality of temporal scope topic map meta-models into resource description framework triples; and program instructions, stored on at least one of the one or more storage devices, to persist the resource description framework triples into a resource description framework repository.

According to another embodiment of the present invention, a computer system for implementing a meta-model service of a service oriented architecture industry model repository into a web ontology language representation of at least one topic map meta-model specific to temporal scope. The computer system comprises: one or more processors, one or more computer-readable memories and one or more computer-readable, tangible storage devices; program instructions, stored on at least one of the one or more storage devices for execution by at least one of the one or more processors via at least one of the one or more memories, to assign topics, occurrences, and attributes from the meta-model service to the at least one topic map meta-model; program instructions, stored on at least one of the one or more storage devices for execution by at least one of the one or more processors via at least one of the one or more memories, to assign topics, occurrences, and attributes from the at least one topic map meta-model to a plurality of temporal scope topic map meta-models, wherein a first temporal scope topic map meta-model of the plurality of temporal scope topic map meta-models represents a state of the at least one topic map meta-model at a first time and wherein a second temporal scope topic map meta-model of the plurality of temporal scope topic map meta-models represents a state of the at least one topic map meta-model at a second time; program instructions, stored on at least one of the one or more storage devices for execution by at least one of the one or more processors via at least one of the one or more memories, to convert the topics, occurrences, and attributes from the plurality of temporal scope topic map meta-models into resource description framework triples; and program instructions, stored on at least one of the one or more storage devices for execution by at least one of the one or more processors via at least one of the one or more memories, to persist the resource description framework triples into a resource description framework repository.

BRIEF DESCRIPTION OF THE SEVERAL VIEWS OF THE DRAWINGS

FIG. 13 shows an example of browsing the repository of the topic map of the UML legacy environment model by association types.

FIG. 14 shows an example of browsing statements within the topic map of the legacy environment model of 'offers' relationship.

FIG. 15 shows an example of two relationships within the topic map of the legacy environment model of 'offers' relationship.

FIG. 16 shows an example of one of the relationships shown in FIG. 15 corresponding to the relationships existing within only a first temporal scope.

FIG. 17 shows an example of the other of the relationships shown in FIG. 15 corresponding to the relationships existing within only a second temporal scope.

DETAILED DESCRIPTION OF THE INVENTION

Figure 1:
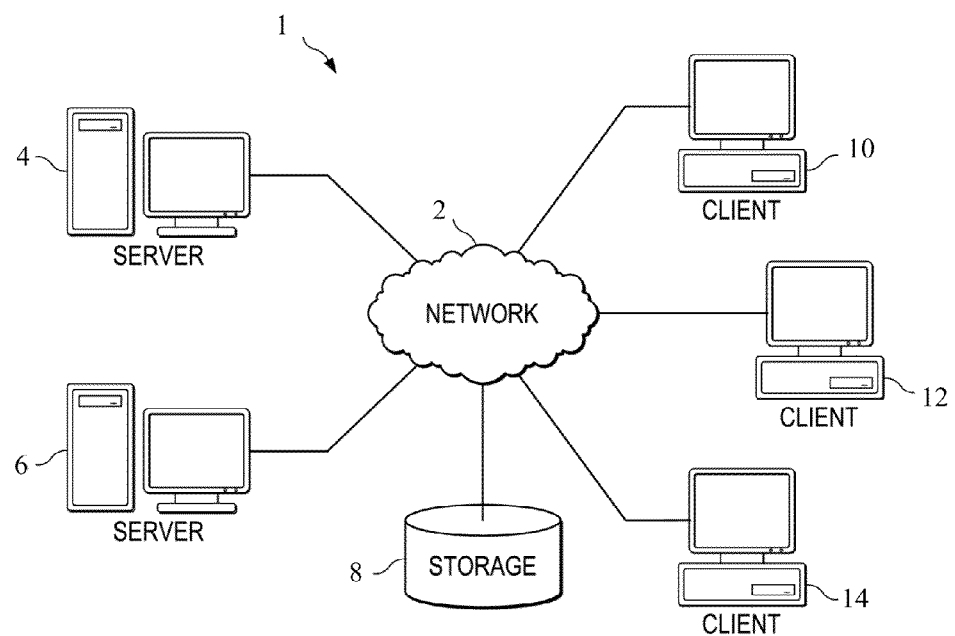
FIG. 1 depicts a pictorial representation of a network of data processing systems in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
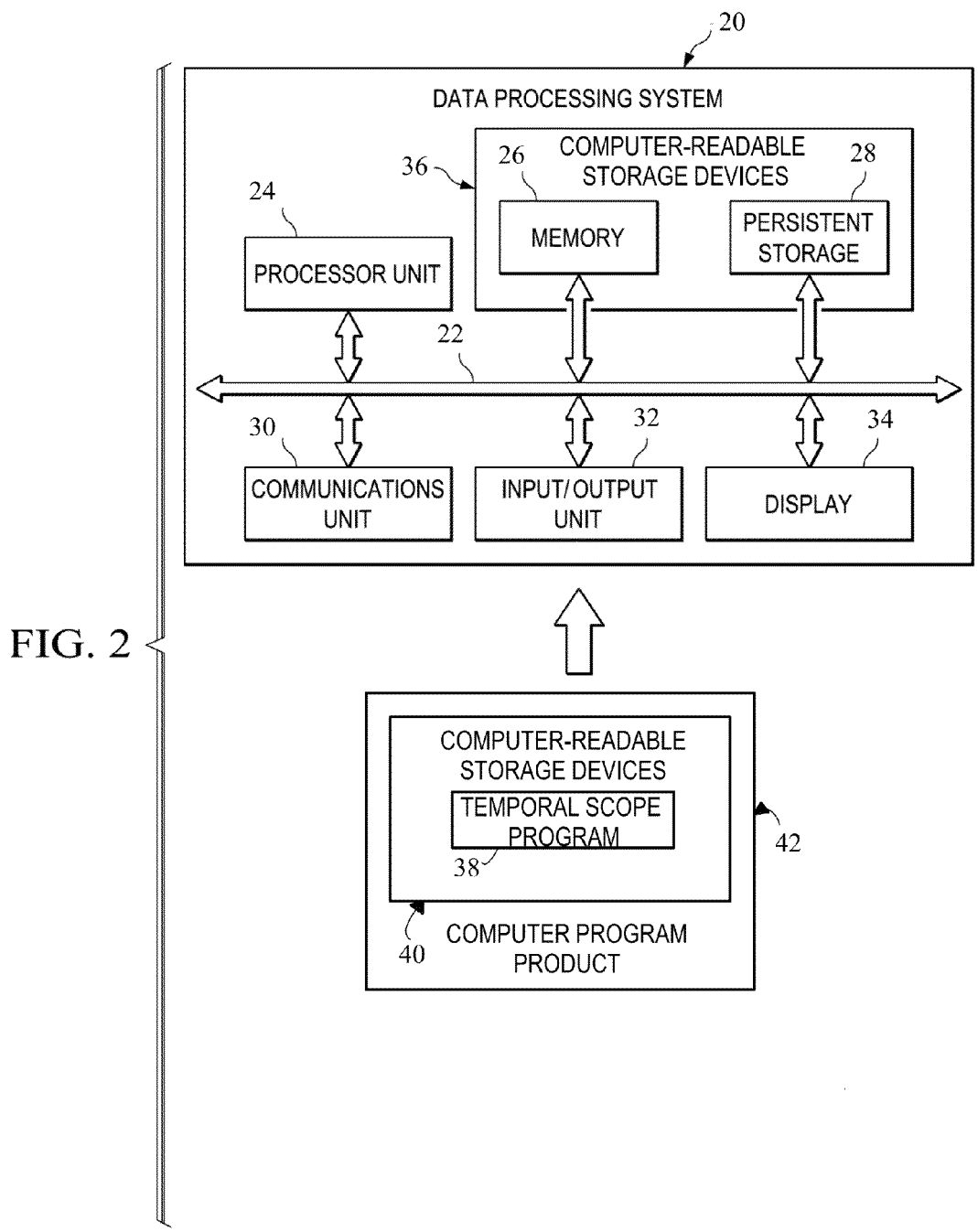
FIG. 2 is a block diagram of a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 1 is a network of computers in which illustrative embodiments may be implemented. Network data processing system 1 contains network 2, which is the medium used to provide communication links between various devices and computers connected together within network data processing system 1. Network 2 may include connections, such as wire, wireless communication links, or fiber optic cables.

In the depicted example, server 4 and server 6 connect to network 2 along with storage unit 8. In addition, clients 10, 12, and 14 connect to network 2. Clients 110, 12, and 14 may be, for example, personal computers or network computers. In the depicted example, server 4 provides information, such as boot files, operating system images, and applications to clients 10, 12, and 14. Clients 10, 12, and 14 are clients to server 4 in this example. Network data processing system 1 may include additional servers, clients, and other devices not shown.

Program code or meta-models located in network data processing system 1 may be stored on a computer-readable storage device and downloaded to a data processing system or other device for use. For example, program code may be stored on a computer-readable storage device on server 4 and downloaded to client 8 over network 2 for use on client 8.

In the depicted example, network data processing system 1 is the Internet with network 2 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 1 also may be implemented as a number of different types of networks, such as, for example, an intranet, local area network (LAN), or a wide area network (WAN). FIG. 1 is intended as an example, and not as an architectural limitation, for the different illustrative embodiments.

With reference now to FIG. 2, a block diagram of a data processing system is shown in which illustrative embodiments may be implemented. Data processing system 20 is an example of a computer, such as server 4 or client 10 in FIG. 1, in which computer usable program code or instructions implementing the processes may be located for the illustrative embodiments. In this illustrative example, data processing system 20 includes communications fabric 22, which provides communications between processor unit 24, memory 26, persistent storage 28, communications unit 30, input/output (I/O) unit 32, and display 34.

Processor unit 24 serves to execute instructions for software, such as temporal scope program 38, that may be loaded into memory 26. Processor unit 24 may be a set of one or more processors, or may be a multi-processor core, depending on the particular implementation. Further, processor unit 24 may be implemented using one or more heterogeneous processor systems in which a main processor is present with secondary processors on a single chip. As another illustrative example, processor unit 24 may be a symmetric multi-processor system containing multiple processors of the same type.

Memory 26 and persistent storage 28 are examples of computer-readable storage devices 36. Memory 26, in these examples, may be, for example, a random access memory or any other suitable volatile or non-volatile computer-readable storage device. Persistent storage 28 may take various forms depending on the particular implementation. For example, persistent storage 28 may contain one or more components or devices. For example, persistent storage 28 may be a hard drive, a flash memory, a rewritable optical disk, a rewritable magnetic tape, or some combination of the above. The media used by persistent storage 28 also may be removable. For example, a removable hard drive may be used for persistent storage 28.

Communications unit 30, in these examples, provides for communications with other data processing systems or devices. In these examples, communications unit 30 is a network interface card. Communications unit 30 may provide communications through the use of either or both physical and wireless communication links.

Input/output unit 32 allows for input and output of data with other devices that may be connected to data processing system 20. For example, input/output unit 32 may provide a connection for user input through a keyboard, a mouse, and/or some other suitable input device. Further, input/output unit 32 may send output to a printer. Display 34 provides a mechanism to display information to a user.

Instructions for an operating system, applications, and/or programs may be located in one or more of computer-readable storage devices 36. Computer-readable storage devices 36 are in communication with processor unit 24 through communications fabric 22. In these illustrative examples the instructions are in a functional form on persistent storage 28. These instructions may be loaded into memory 26 for running by processor unit 24. The processes of the different embodiments may be performed by processor unit 24 using program instructions, which may be located in a memory, such as memory 26.

These program instructions are referred to as program code, computer usable program code, or computer-readable program code, that may be read and run by a processor in processor unit 24. The program code in the different embodiments may be embodied on different physical or tangible computer-readable media, such as memory 26 or persistent storage 28.

Temporal scope program 38 is located in a functional form on one or more computer-readable storage devices 40. One or more of computer-readable storage devices 40 may be selectively removable. Temporal scope program 38 may be loaded onto or transferred to data processing system 20 for running by processor unit 24. Temporal scope program 38 and computer-readable storage devices 40 form computer program product 42 in these examples. In some instances, one or more of computer-readable storage devices 40 may not be removable.

Alternatively, temporal scope program 38 may be transferred to data processing system 20 from computer-readable storage devices 40 through a communications link to communications unit 30 and/or through a connection to input/output unit 32. The communications link and/or the connection may be physical or wireless in the illustrative examples.

In some illustrative embodiments, temporal scope program 38 may be downloaded over a network to persistent storage 28 from another device or data processing system for use within data processing system 20. For instance, program code stored in a computer-readable storage device in a server data processing system may be downloaded over a network from the server to data processing system 20. The data processing system providing temporal scope program 38 may be a server computer, a client computer, or some other device capable of storing and transmitting temporal scope program 38.

The different components illustrated for data processing system 20 are not meant to provide architectural limitations to the manner in which different embodiments may be implemented. The different illustrative embodiments may be implemented in a data processing system including components in addition to, or in place of, those illustrated for data processing system 20. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a bus system may be used to implement communications fabric 22 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 26 or a cache such as found in an interface and memory controller hub that may be present in communications fabric 22.

Figure 3:
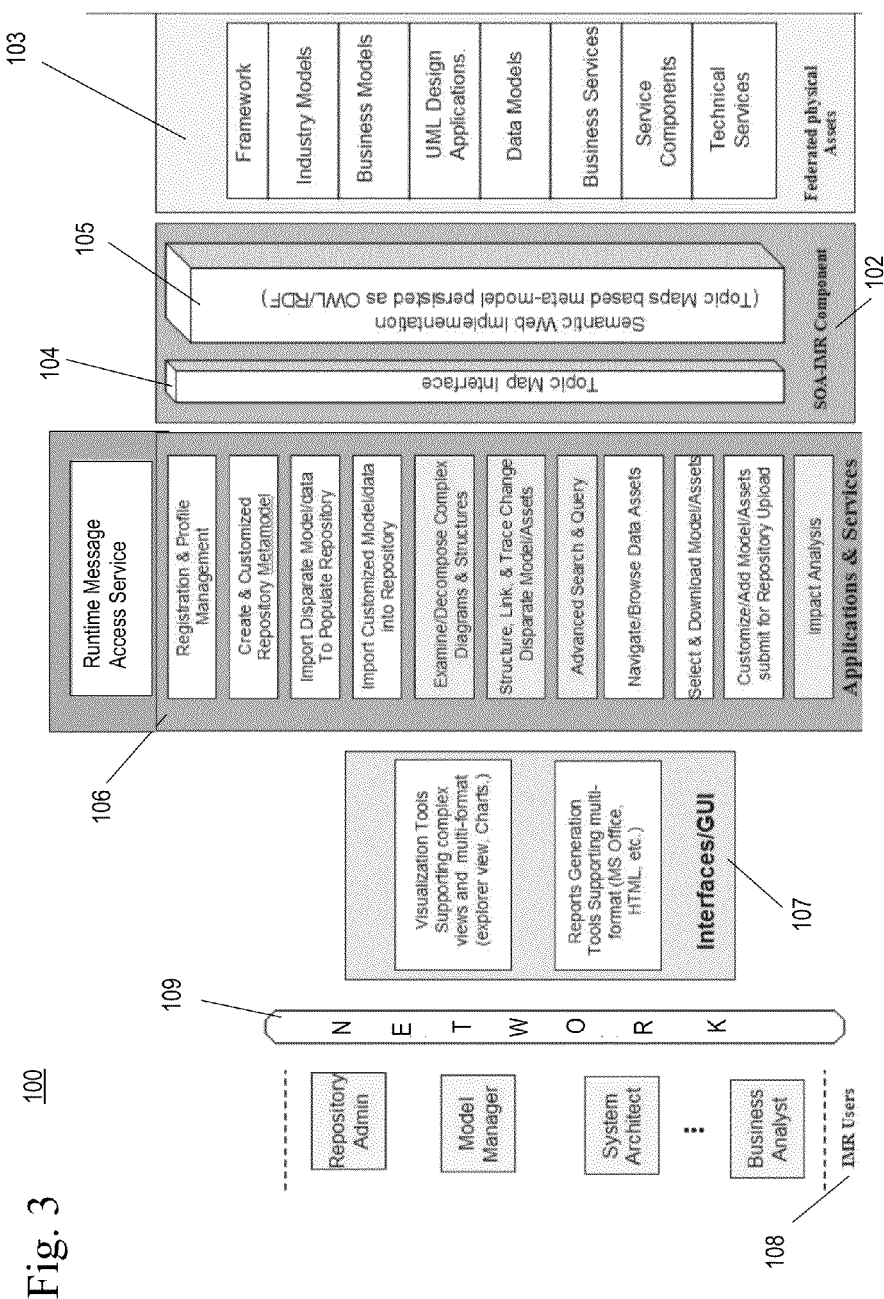
FIG. 3 shows an example of an industry model repository (IMR) architecture system including a service oriented architecture (SOA) industry model repository (IMR) component.

FIG. 3 shows an example of an industry model repository (IMR) architecture system 100 including a service oriented architecture (SOA) industry model repository (IMR) component 102. The IMR architecture system 100 may be part of the network data processing system 1 shown in FIG. 1. The SOA-IMR component 102 provides tools to facilitate the consumption and reuse of model assets through topic map IMR meta-model creation and topic map interface 104 and semantic web implementation 105 which represent and implement IMR meta-models using semantics provided by the web ontology language (OWL). The SOA IMR component 102 is discussed in further detail in an application entitled, "SERVICE ORIENTED ARCHITECTURE INDUSTRY MODEL REPOSITORY META-MODEL WITH A STANDARD BASED INDEX" filed Dec. 17, 2009 as application Ser. No. 12/640,624. Semantic web implementation 105 is described in greater detail below.

The IMR architecture system 100 includes federated physical model assets 103 that are stored in different types of repositories depending on the model driven framework tools and products that are being deployed by the IMR architecture system 100. The federated physical assets may include framework, industry models, business models, unified modeling language (UML) design applications, data models, business services, service components, and technical services. The federated physical assets are not limited to the assets shown in FIG. 3.

Figure 9:
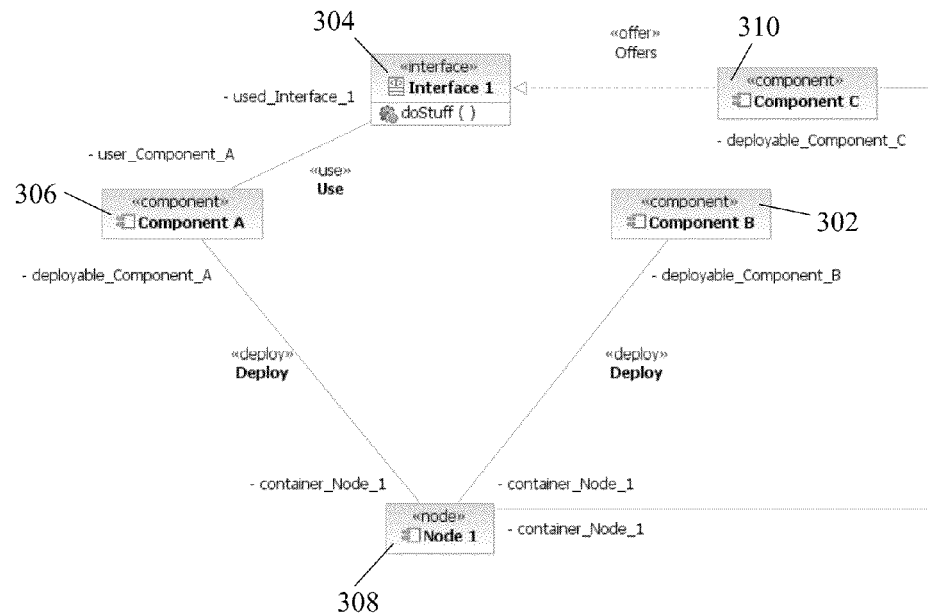
FIG. 9 shows a topic map meta-model of a UML legacy application environment model in a second temporal scope.
Figure 10:
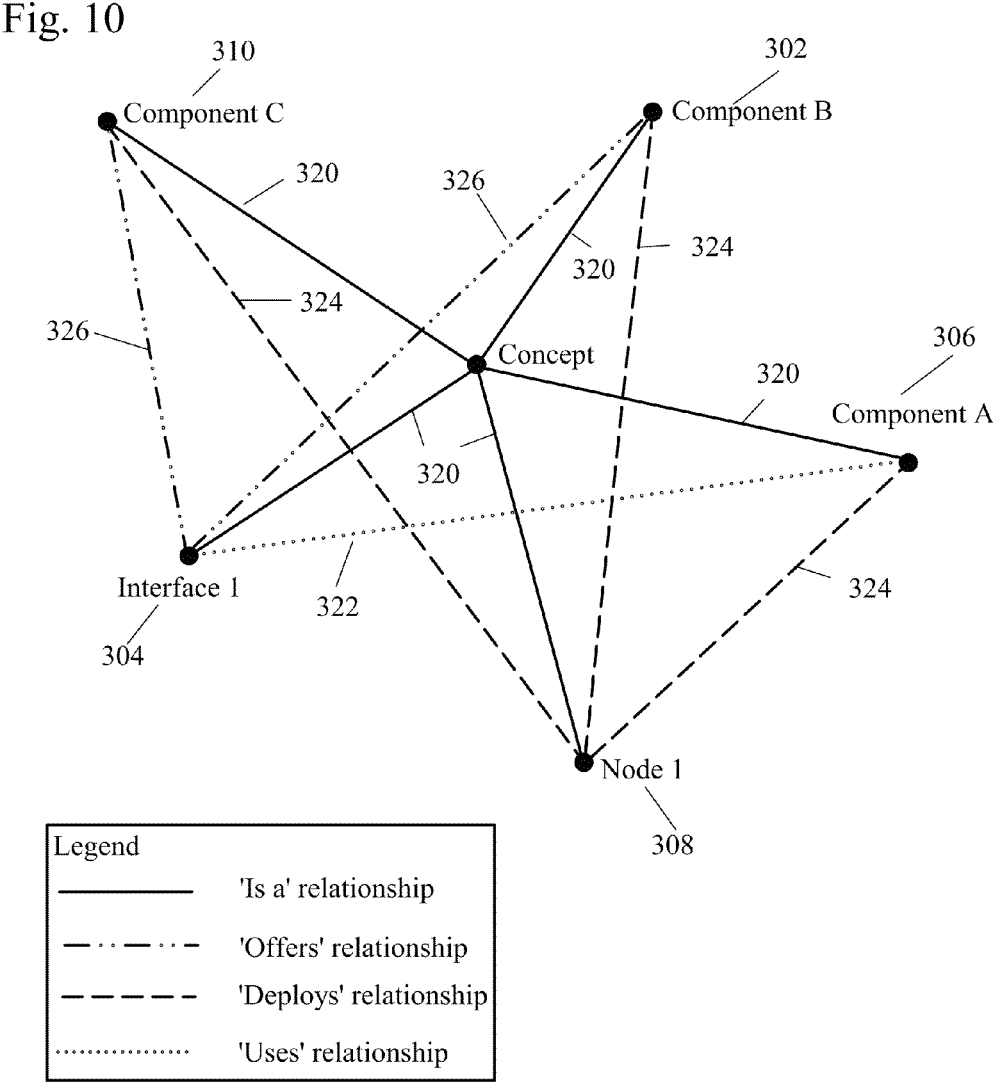
FIG. 10 shows an exemplary OWL/RDF representation of the UML legacy environment model.
Figure 11:
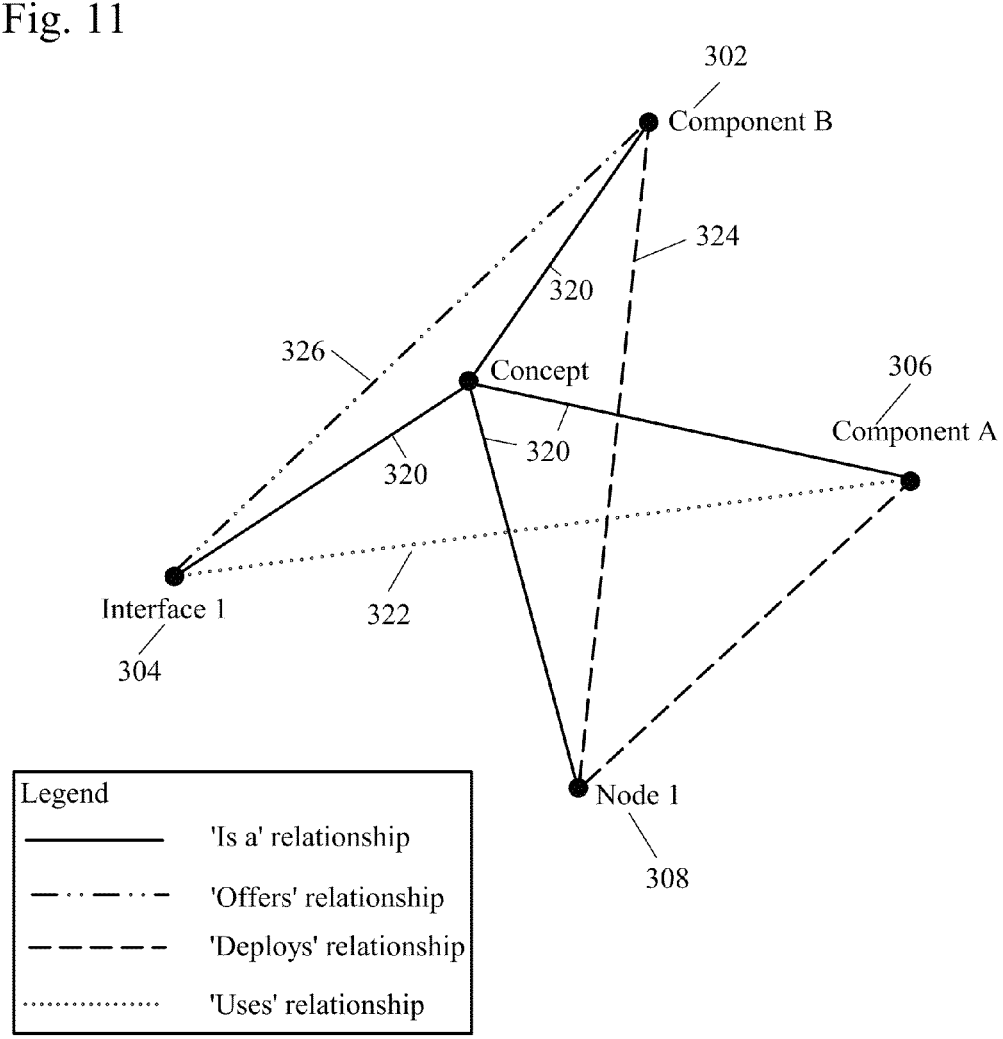
FIG. 11 shows an exemplary OWL/RDF representation of the UML legacy environment model in a first temporal scope.

Applications and services 106 are provided to IMR users 108 through the network 109 (e.g. intranet or Internet) or network 2 of FIG. 1, using interfaces 107. The interfaces 107 may be a graphically enabled, allowing display of topics maps to a user 108. The interfaces 107 used by the IMR users 108 includes reports generation and tools supporting multi-formats and visualization tools supporting complex views. The interfaces 107 may be packaged as an Eclipse client, provided by a vendor specialized in providing software development tools and products or deployed inside bigger scope modeling tools, for example IBM® Rational® Software Architect or WebSphere® Business Modeler, products of International Business Machines Corporation. Examples of a graphical display using an Eclipse client are shown in FIGS. 9-11.

The applications and services 106 may include registration and profile management; creating and customizing repository meta-model; importing customized and disparate model/data into the repository; examining/decomposing complex diagrams and structures; structure, link, and trace change disparate model/assets; advanced search and query, navigate/browse data assets; select and download model/assets; customize/add models/assets submit for repository upload; and impact analysis. The application and services are not limited to the assets shown in FIG. 3. The applications and services are described in greater detail in applications entitled "FRAMEWORK TO POPULATE AND MAINTAIN A SERVICE ORIENTED ARCHITECTURE INDUSTRY MODEL" filed Dec. 17, 2009 as application Ser. No. 12/640,749; "MANAGING AND MAINTAINING SCOPE IN A SERVICE ORIENTED ARCHITECTURE INDUSTRY MODEL REPOSITORY" filed Dec. 17, 2009 as application Ser. No. 12/640,852; and "RECOGNITION OF AND SUPPORT FOR MULTIPLE VERSIONS OF AN ENTERPRISE CANONICAL MESSAGE MODEL" filed Dec. 17, 2009 as application Ser. No. 12/640,865. The interfaces 107 are further described in greater detail in an application entitled, "SERVICE ORIENTED ARCHITECTURE INDUSTRY MODEL REPOSITORY META-MODEL WITH A STANDARD BASED INDEX" filed Dec. 17, 2009.

The IMR users 108 may include but are not limited to a repository administrator, a model manager, a system architect, and a business analyst.

Figure 4:
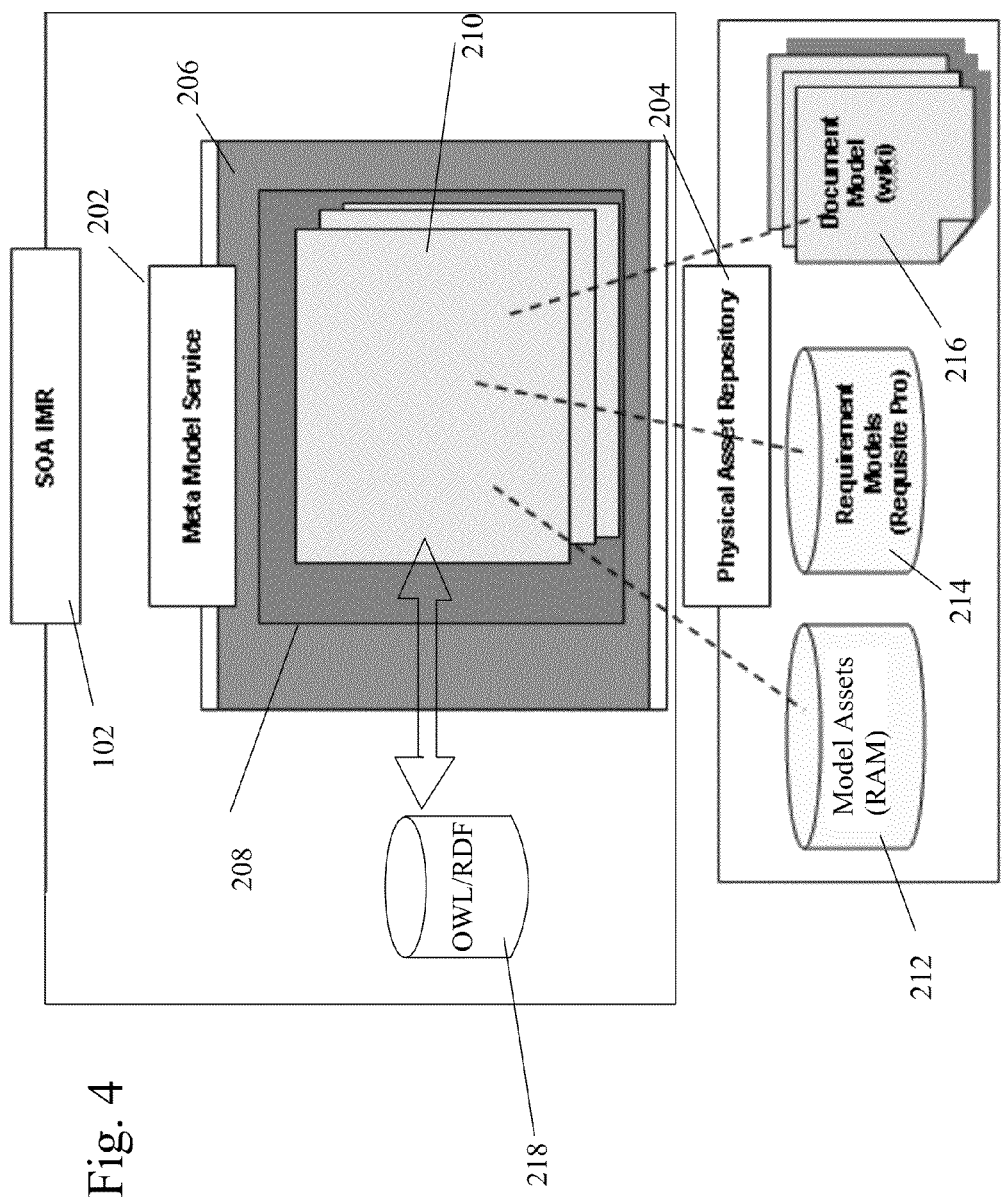
FIG. 4 shows an overview of a service oriented architecture (SOA) industry model repository (IMR) meta-model with OWL/RDF maps.

FIG. 4 shows an overview of a service oriented architecture (SOA) industry model repository (IMR) meta-model with OWL/RDF maps. The SOA IMR component 102 includes a meta-model service 202 associated with the physical asset repository 204. Within the meta-model service 202 is a meta-meta-model 206 with a topic map based index, an information model repository (IMR) common meta-meta-model 208 and at least one topic map meta-model 210 with data specific to a particular topic or industry vertical or temporal scope. The at least one topic map meta-model 210 is associated with the physical asset repositories which may include but are not limited to physical asset repository 204 of model assets. The model assets may include random access memory (RAM) 212, requirement models 214, and document models (wiki) 216.

The internal meta-model service 202 of the SOA IMR component 102 is an SOA IMR meta-model service and preferably uses at least one topic map meta-model 210 that is an ISO Standard topic map meta-model. Topic Maps are an ISO/IEC standard (ISO 13250-1) and map both web and real-world information resources, by reifying real-world resources as "subjects" and creating "topic" constructs to capture their characteristics and relationships with other topics and subjects. By using the meta-models 206, 208, and 210 as the physical asset repository 204 internal meta-model, an interface of the common meta-model service 202 allows users to programmatically access, manage, and maintain these meta-models.

A meta-model based on topic maps can be built using a number of technologies such as topic map related ISO/IEC standards (ISO 13250-1) and individual semantic technologies such as web ontology language (OWL), resource description framework (RDF) and SPARQL protocol and RDF query language (SPARQL).

Unified Modeling Language (UML) meta-models may be used to present artifacts of an object-oriented software-intensive system under development. The UML meta-model may be of an object-oriented software-intensive system that is part of the network data processing system 1 shown in FIG. 1 and/or the physical assets of the IMR architecture system 100 shown in FIG. 3 and is preferably stored in a repository 204.

The SOA IMR meta-model service 202 maps the at least one topic map meta-models 210 to an OWL representation of the at least one topic map meta-models 210. The industry model repository (IMR) provides the context for the implementation of mapping the at least one topic map meta-model 210 to the OWL representations of the at least one topic map meta-model 210. The OWL representation of the at least one topic map meta-model 210 are stored in a resource description framework (RDF) semantic web repository 218. An example of semantic web repository 218 is a Sesame RDF Server which is an open source framework for querying and analyzing RDF data. Semantic web repository 218 preferably allows for versioning and merging of asset-requirement topic maps and therefore allows topic maps to be built up by different domain experts to be organized in conceptual spaces according to meaning and by temporal scope or time.

Figure 5:
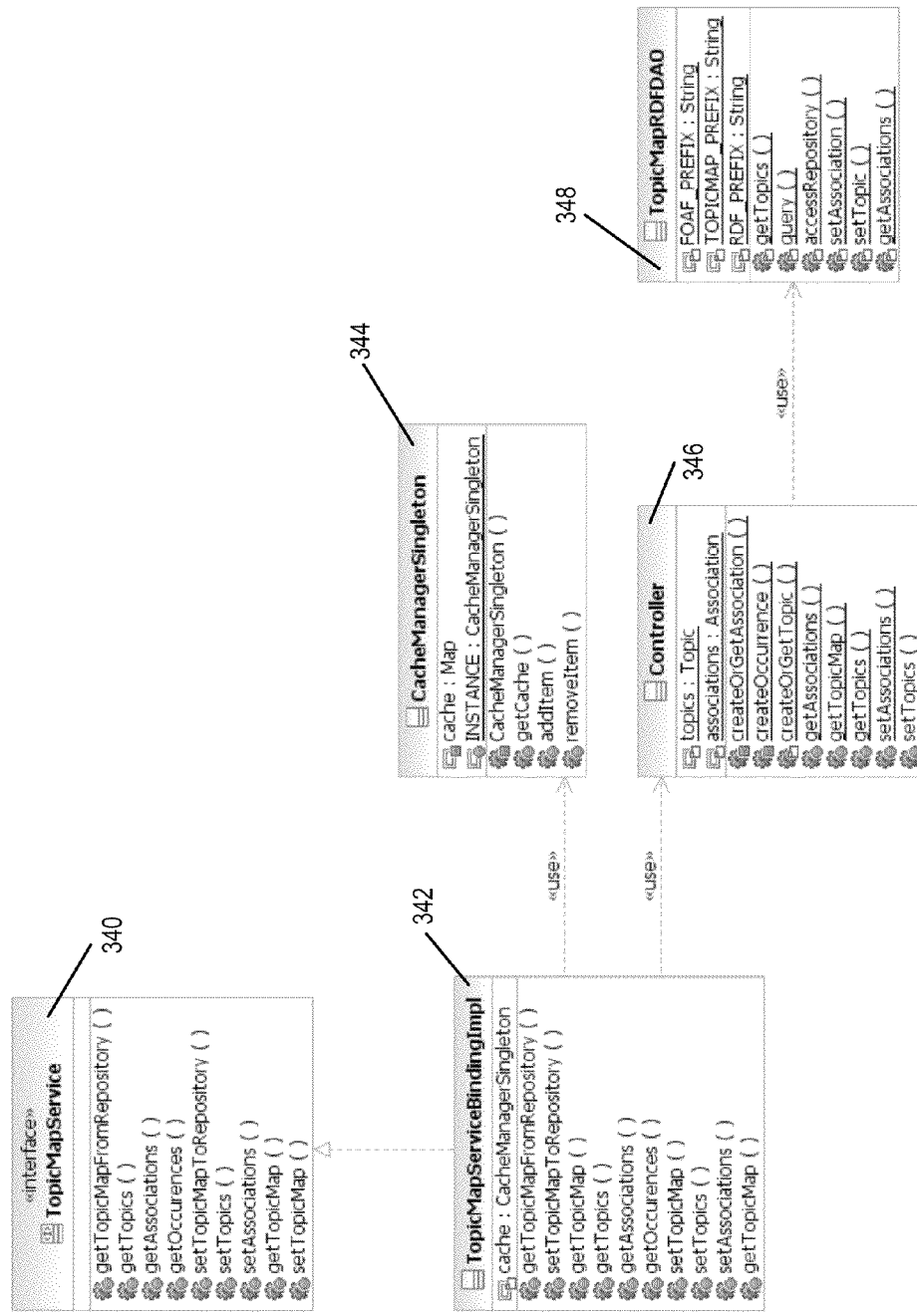
FIG. 5 shows an exemplary implementation of a UML class diagram of the showing Java implementation of an SOA IMR meta data management interface in which illustrative embodiments may be implemented.

FIG. 5 depicts an exemplary implementation of a UML class diagram showing Java implementation of an SOA IMR meta data management interface in which illustrative embodiments may be implemented. The TopicMapService 340 is an interface is implemented by a class referred to as TopicMapServiceBindingImpl 342. TopicMapServiceBindingImpl 342 uses a CacheManagerSingleton 344 to add and remove an item from a cache and a Controller 346 to create or get Associations, create Occurrence, create or get Topics, get TopicMaps and set Associations and Topics. The Controller 346 uses a class referred to as TopicMapRDFDAO 348 to provide the conversation of the at least one topic map meta-model 210 to an OWL-DL representation 218. The TopicMapRDFDAO 348 converts a topic of the at least one topic map meta-model 210 into RDF triples and then the RDF triples are persisted in a RDF repository, such as RDF semantic web repository 218.

In accordance with one embodiment of the present invention, a method of expressing a meta-model is provided. The meta-model may have temporal dependent relationships or no temporal dependent relationships, such that time or temporal variance is treated orthogonal to the model and mathematical set theory can be used to create, maintain, and validate the model with a high degree of accuracy. The method can also show evolution of the model over time through at least two different times or temporal scopes. The meta-model may also display relevant subsets of the information to the end user based on user criteria such as time and relationships. Therefore, unlike the prior art, snap shots of specific time points through the evolution of the meta-model may be viewed by a user.

Figure 6:
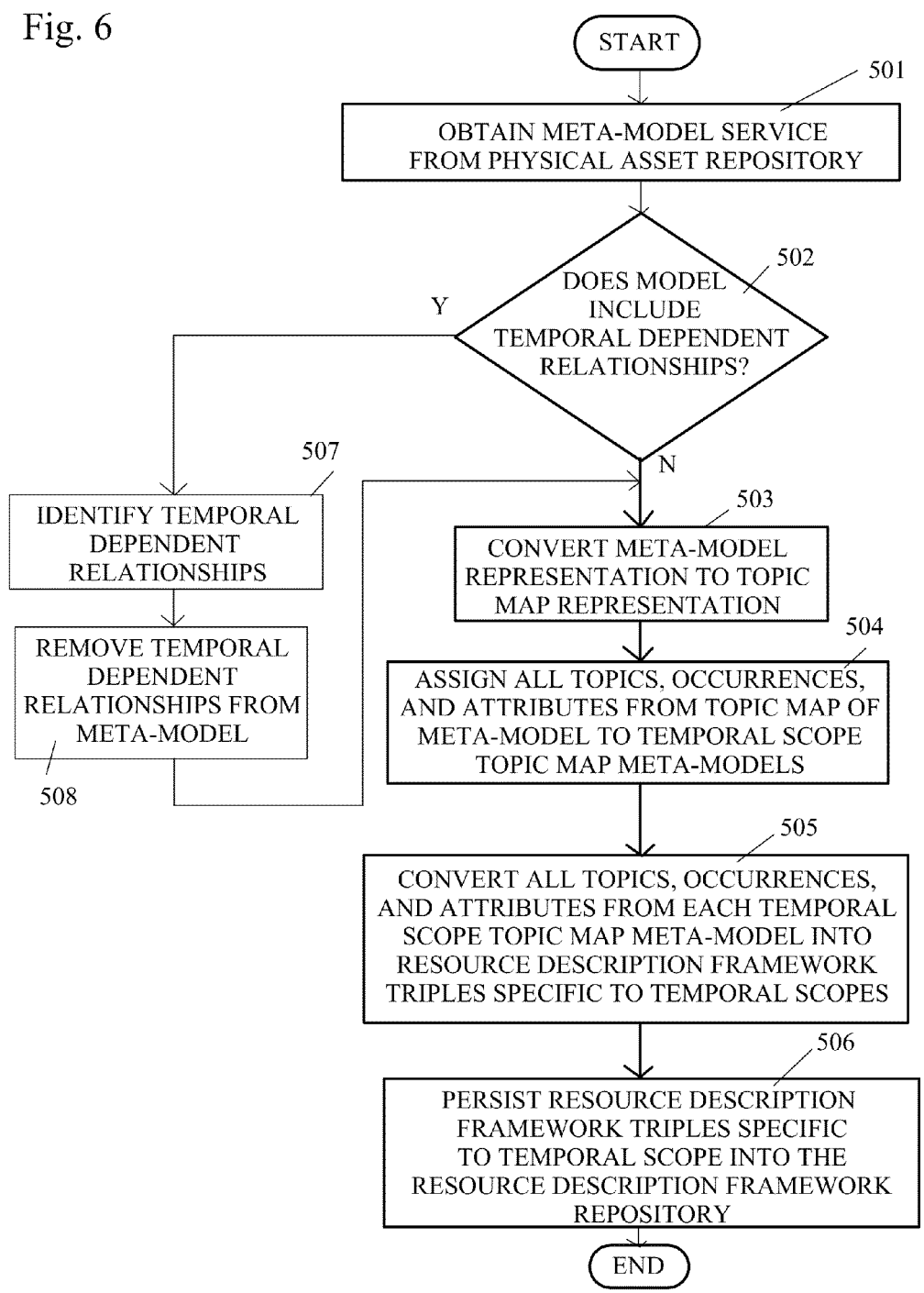
FIG. 6 shows steps for expressing temporal variance orthogonal to a meta-model service.

FIG. 6 shows a flowchart of a method of expressing meta-model services such that temporal variance is orthogonal to the model according to an illustrative embodiment. It will be understood that, in one exemplary embodiment, each block or combination of blocks shown in FIG. 6 can be implemented by program instructions of temporal scope program 38 of FIG. 2, which computer program instructions can be stored on computer readable storage devices 40 of FIG. 2 and can be executed by processor unit 24 of FIG. 2.

Referring to FIG. 6, a first step of a method of expressing a meta-model such that temporal variance is orthogonal to the model obtains a meta-model service, such as meta-model service 202 of FIG. 4, from an asset repository, such as physical asset repository 204 of FIG. 4 (step 501). If the meta-model service includes temporal dependent relationships (step 502), identify the temporal dependent relationships (step 507), and remove the temporal dependent relationships from the meta-model service (step 508). The identification of the temporal dependent relationships may be done by a domain expert and facilitated by temporal scope program 38 of FIG. 2. In response to removing the temporal dependent relationships have been removed from the meta-model service 202 (step 508), convert the resulting meta-model service representation to a topic map representation or topic map of the meta-model service (step 503). From the topic map representation or the topic map of the meta-model service, assign all topics, occurrences, and attributes within the at least one topic map meta-model 210 to the temporal scope topic map meta-models (step 504). Next, convert all topics, occurrences, and attributes from each of the temporal scope topic map meta-models into resource description framework triples specific to temporal scopes (step 505). Then, persist all of the resource description framework triples specific to temporal scope into an RDF repository, such as RDF semantic web repository 218 (step 506). Step 505 may be carried out using the steps shown in FIGS. 7a-7b.

Figure 7A:
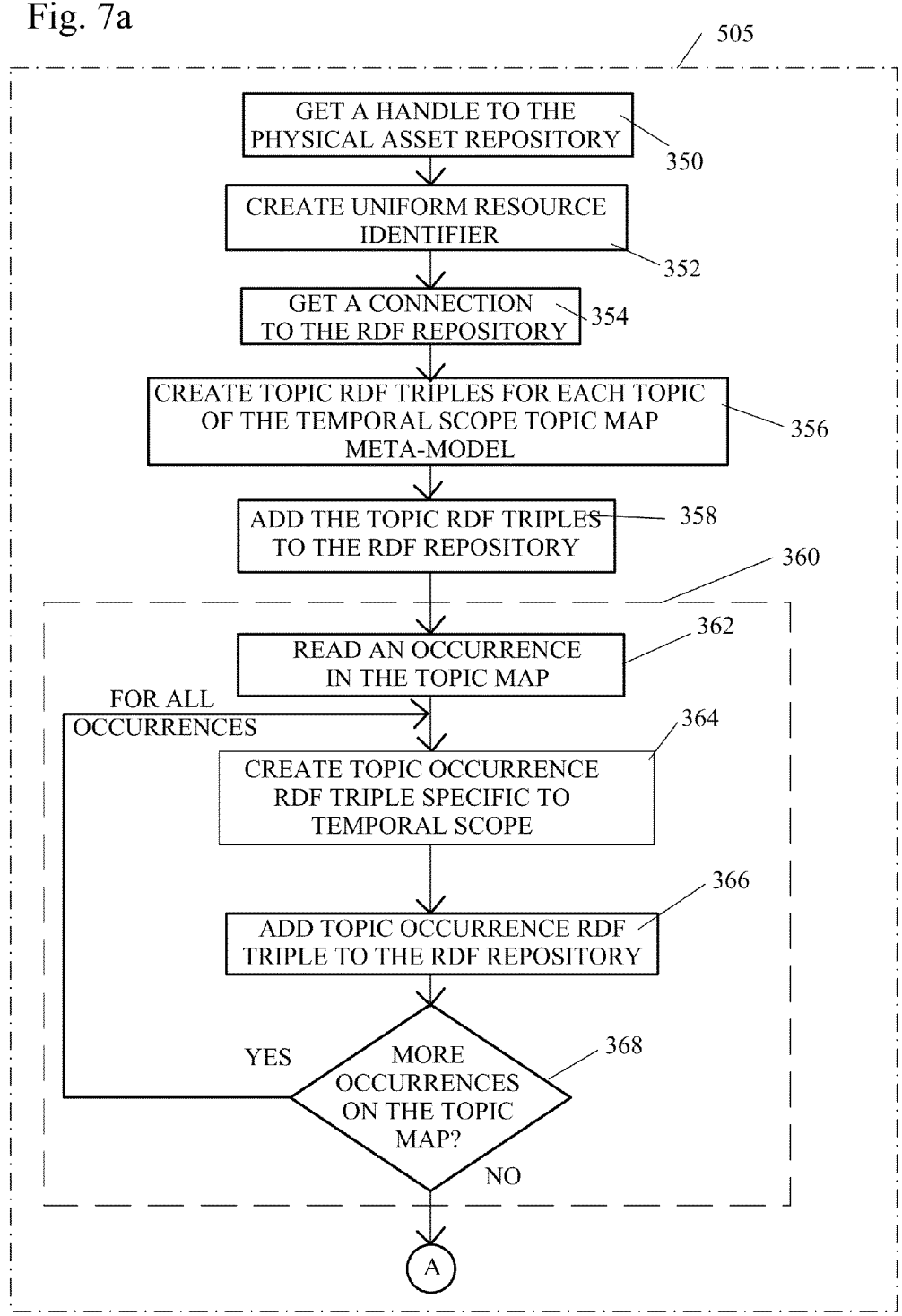
FIGS. 7a-7b shows a flowchart of an exemplary implementation of a method of taking in a topic and all of the locations of the topic on an RDF server and particular repository to be used for persisting a resulting RDF in which illustrative embodiments may be implemented.
Figure 7B:
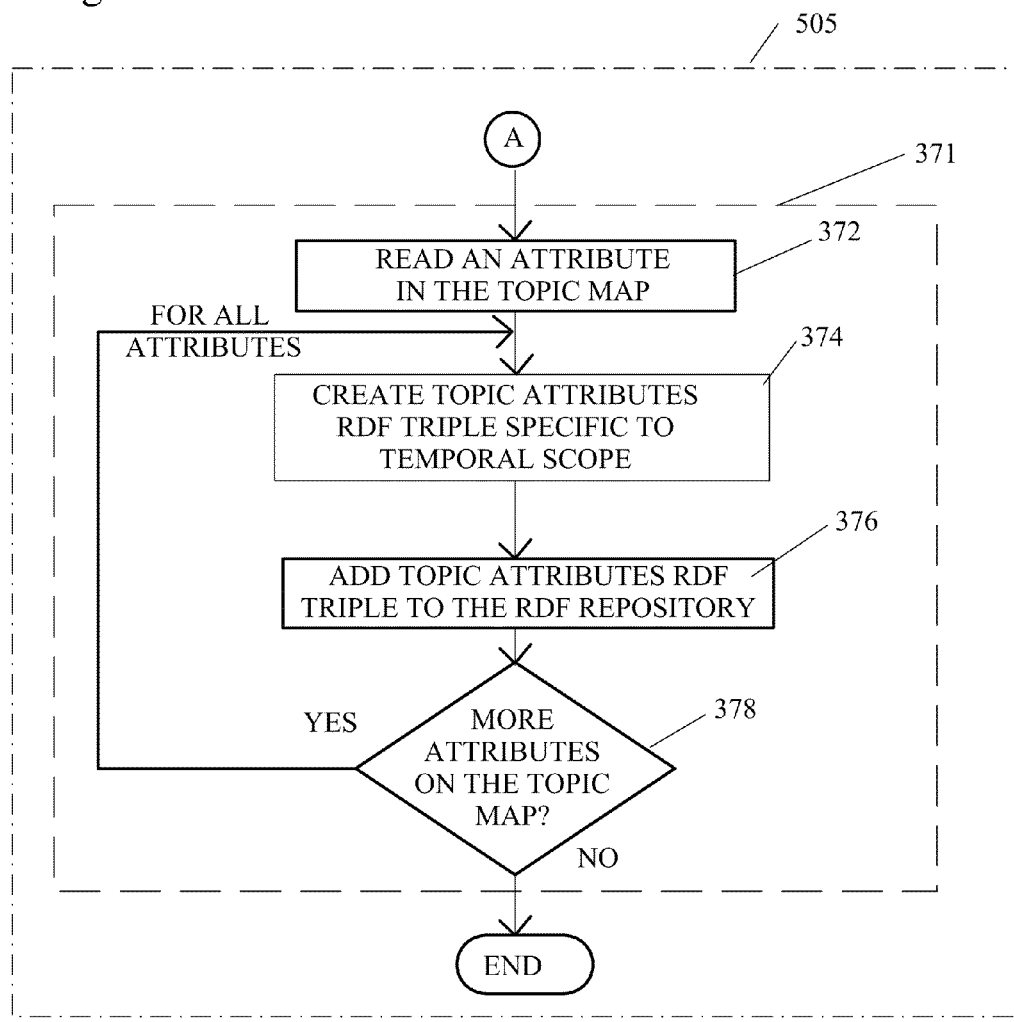

FIGS. 7a-7b shows a flowchart of an exemplary implementation of a method of taking in a topic and all of the locations of the topic on an RDF server and a particular repository to be used for persisting the resulting RDF in which illustrative embodiments may be implemented. It will be understood that, in one exemplary implementation, each block or combination of blocks shown in FIG. 5 can be implemented by program instructions of temporal scope program 38 of FIG. 2, which computer program instructions can be stored on computer readable storage devices 40 of FIG. 2 and can be executed by processor unit 24 of FIG. 2.

Referring to FIGS. 7a-7b, the temporal scope program 38 obtains a handle to an asset repository, such as physical asset repository 204 of FIG. 4 or another repository (step 350). Uniform resource identifiers for each topic of a temporal scope topic map meta-model are created (step 352). The temporal scope program 38 obtains a connection to an RDF repository, such as RDF semantic web repository 218 (step 354). Topic RDF statements or RDF triples for each topic of the temporal scope topic map meta-model with data specific to temporal scope are created (step 356), and the topic RDF statements or RDF triples are added to the RDF repository (step 358).

Topic occurrence RDF statements or RDF triples are created (step 360) to be sent to the RDF repository. To create a topic occurrence RDF statement or RDF triple (step 360), an occurrence of the topic with data specific to temporal scope in the temporal scope topic map meta-model is read (step 362) and a topic occurrence RDF statement or RDF triple based on the occurrence of the topic with data specific to temporal scope is created (step 364). The topic occurrence RDF statement or RDF triple is added to the RDF repository (step 366). If there are additional occurrences of the topic with data specific to temporal scope in the topic map (step 368), the steps of creating a topic occurrence RDF statement or RDF triple (step 364) and adding a topic occurrence RDF statement to the RDF repository (step 366) are repeated until no more occurrence of the topic on the temporal scope topic map meta-model occur.

When no occurrences remain, the topic attribute RDF statements or RDF triples are created (step 371) to be sent to the RDF repository. To create a topic attribute RDF statement or RDF triple (step 371), an attribute of the topic with data specific to temporal scope in the temporal scope topic map meta-model is read (step 372), and a topic attribute RDF statement or RDF triple based on the attribute of the topic with data specific to temporal scope is created (step 374). The topic attribute RDF statement or RDF triple is added to the RDF repository, such as RDF semantic web repository 218 (step 376). If there are additional attributes of the topic with data specific to temporal scope in the topic map (step 378), the steps of creating a topic attribute RDF statement or RDF triple (step 374) and adding a topic attribute RDF statement to the RDF repository (step 376) are repeated until no more attribute of the topic on the temporal scope topic map meta-model occur.

When no attributes remain, the method of taking in a topic and all of the locations of the topic on the RDF server and the particular repository to be used for persisting the resulting RDF ends. All of the locations of the topic on the RDF server and the particular repository to be used for persisting the resulting RDF triples are accounted for and the resource description framework triples specific to temporal scope are persisted into the RDF repository (step 506).

Figure 18:
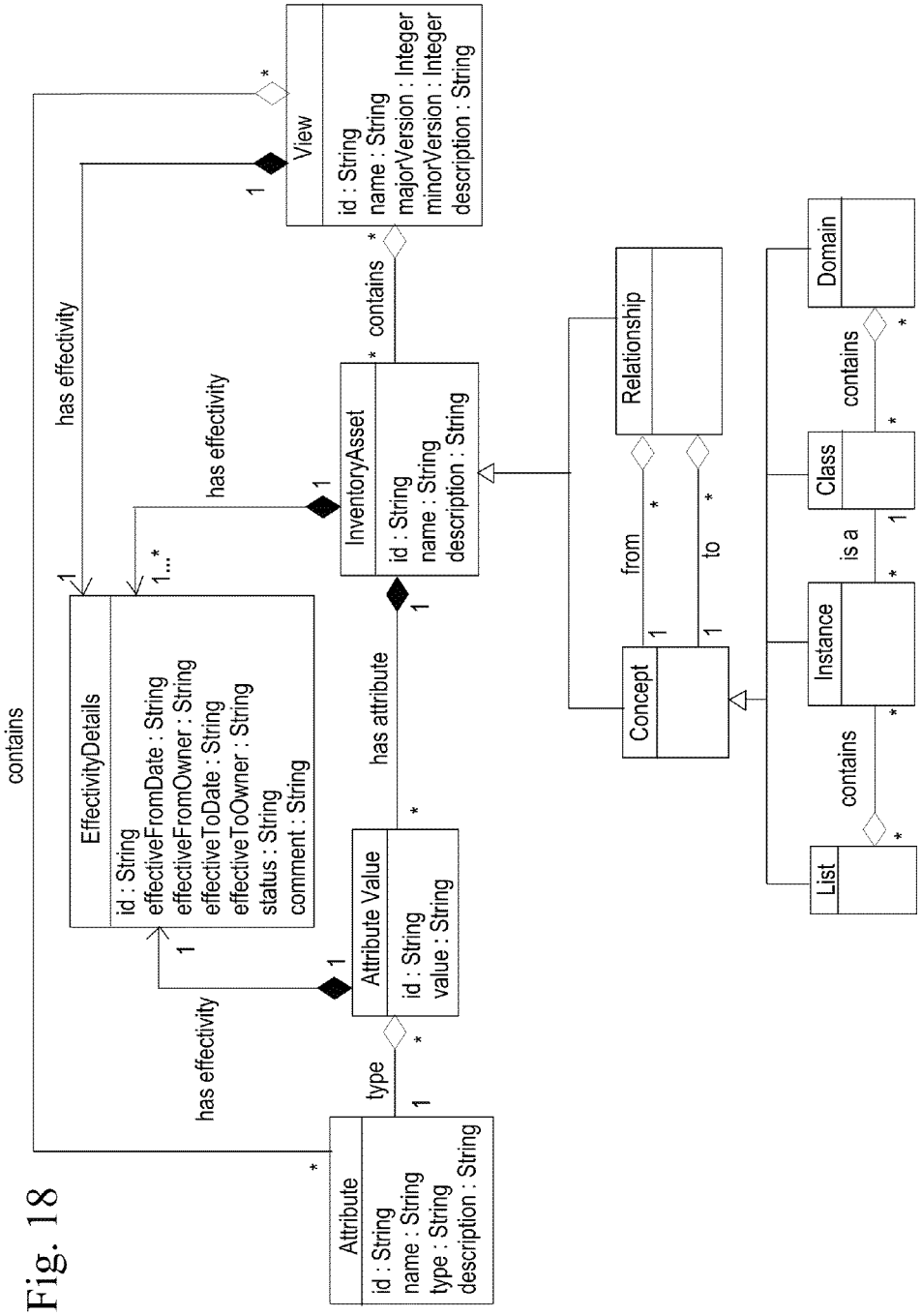
FIG. 18 shows an example of a UML diagram of a meta-model with temporal dependent relationships.

FIG. 18 shows an example of a UML class diagram of a meta-model with temporal dependent relationships already present within the meta-model. From FIG. 18, Concept is an InventoryAsset and Relationship is an InventoryAsset. InventoryAsset has temporal information in the form of EffectivityDetails. Within the EffectivityDetails, an InventoryAsset is defined as being effective from a date or to a date, and therefore, Concept and Relationship are temporally aware or have temporally dependent relationships. In this example, the EffectivityDetails class would be removed from the model and modeled as a scope object within the topic map meta-model.

Returning to FIG. 6, if the meta-model service 202 does not include temporal dependent relationships (step 502), convert the meta-model service representation to a topic map representation or topic map of the meta-model service(step 503). From the topic map representation or the topic map of the meta-model service, assign all topics, occurrences, and attributes to temporal scope topic map meta-models (step 504). Next, convert all topics, occurrences, and attributes from each of the temporal scope topic map meta-models into resource description framework triples specific to temporal scopes (step 505). Then, persist all of the resource description framework triples specific to temporal scope into the RDF repository (step 506). Step 505 may be carried out using the steps shown in FIGS. 7*a*-7*b*.

Figure 8:
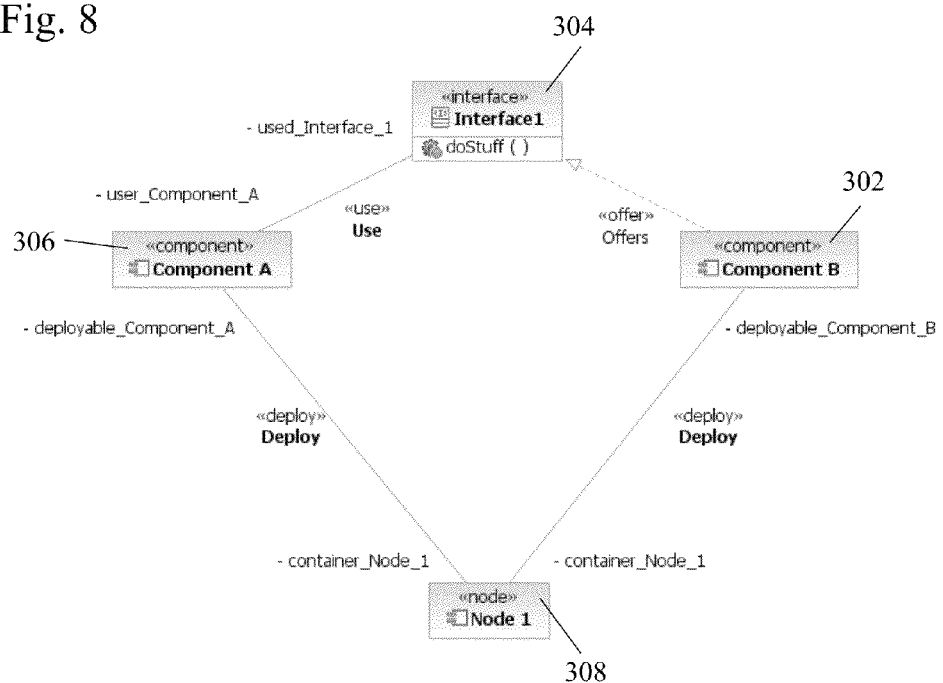
FIG. 8 shows a topic map meta-model of a UML legacy application environment model in a first temporal scope.

FIGS. 8 and 9 show examples of topic maps of a unified modeling language (UML) meta-model for a system in a first temporal situation and a second temporal situation (e.g. temporal scope topic map meta-models) or two different time aspects with time/temporal scope being the measured or measurable period during which an action, process, or condition exists or continues.

In FIGS. 8 and 9, for example, Component A 306, Component B 302, Node1 308, and Interface1 304 are all assigned as topics. Association types from the topic map may include 'is an', 'deploy', 'use', and 'offers' for example.

In the first temporal situation shown in FIG. 8, Component B 302 offers Interface1 304, Interface1 304 uses Component A 306 and Node1 308 deploys Components A and B 306, 302.

In the second temporal situation, shown in FIG. 9, Component B 302 no longer offers Interface1 304. Instead, a Component C 310 is deployed from Node1 308 and offers Interface1 304. Additionally as in the first temporal situation, Interface1 304 uses Component A 306 and Node1 308 deploys Components A and B 306, 302.

In viewing the model in the second temporal situation, the relationship that was originally present in a different temporal scope between Component B 302 and Interface1 304 would not be apparent, since temporal scope is the measured or measurable period during which an action, process, or condition exists or continues.

In other words, for example, in the first temporal situation, the topic map of the model indicates the architecture of a subway system as present in 1960 and in the second temporal situation, the topic map of the model indicates the architecture of the same subway system as present in 2010. The subway system in 2010 now offers "Station" Component C, which is deployed from an "originating stop" Node1 and offers "Destination Station" Interface1. In 1960, "Station" Component C was not present and could not be used to get to "Destination Station" Interface1, instead, "Station" Component B offered the only means to offer "Destination Station" Interface1 as a location in the "subway".

One example of how all topics, occurrences, and attributes from each temporal scope topic map meta-models are converted into resource description framework triples specific to temporal scopes (step 505) may be carried out is to implement the ISO topic map of the UML meta-model to a web ontology language (OWL) representation of the topic map. The industry model repository (IMR) provides the context for the implementation of the at least one topic map meta-models 210 to the OWL representation of the topic maps. The OWL representation of the topic map is preferably stored in a resource description framework (RDF) semantic web repository. An example of a semantic web repository is a Sesame RDF Server which is an open source framework for querying and analyzing RDF data. The RDF repository preferably allows for versioning and merging of topic maps through different temporal scopes and therefore allows topic maps to be built up by different domain experts to be organized into conceptual spaces by a measured or measurable period during which an action, process, or condition exists or continues meaning.

FIG. 10 shows an exemplary graphical OWL representation of the topic map meta-model of the UML meta-model before temporal variance was introduced as scope or the UML meta-model was defined to a specific time.

As shown, a relationship 'is' present between a Concept and Component A 306, Component B 302, Node1 308, Interface1 304 and Component C 310, indicated by the solid line 320. Interface1 304 'uses' Component A 306 as indicated by the dotted line 322. Node1 308 'deploys' Component C 310, Component B 302, and Component A 306 as indicated by the dashed line 324. Interface1 304 'offers' Component C 310 and Component B 302 as indicated by the dash-dot-dot lines 326.

In referring back to FIGS. 8 and 9, showing the temporal scope topic maps of the UML models at different times, the graphical OWL representation in FIG. 10 indicates the relationships between Interface1 304 and Components B and C 302, 310, but not when they occurred or whether they are current to the system.

FIG. 11 shows an exemplary graphical OWL representation of the temporal scope topic map of the UML model corresponding to the first temporal scope shown in FIG. 8. As shown, a relationship 'is' present between a Concept and Component A 306, Component B 302, Node1 308, and Interface1 304, indicated by the solid line 320. Interface1 304 'uses' Component A 306 as indicated by the dotted line 322. Node1 308 'deploys' Component B 302 and Component A 306 as indicated by the dashed line 324. Interface) 304 'offers' Component B 302 as indicated by the dash-dot-dot lines 326.

Figure 12:
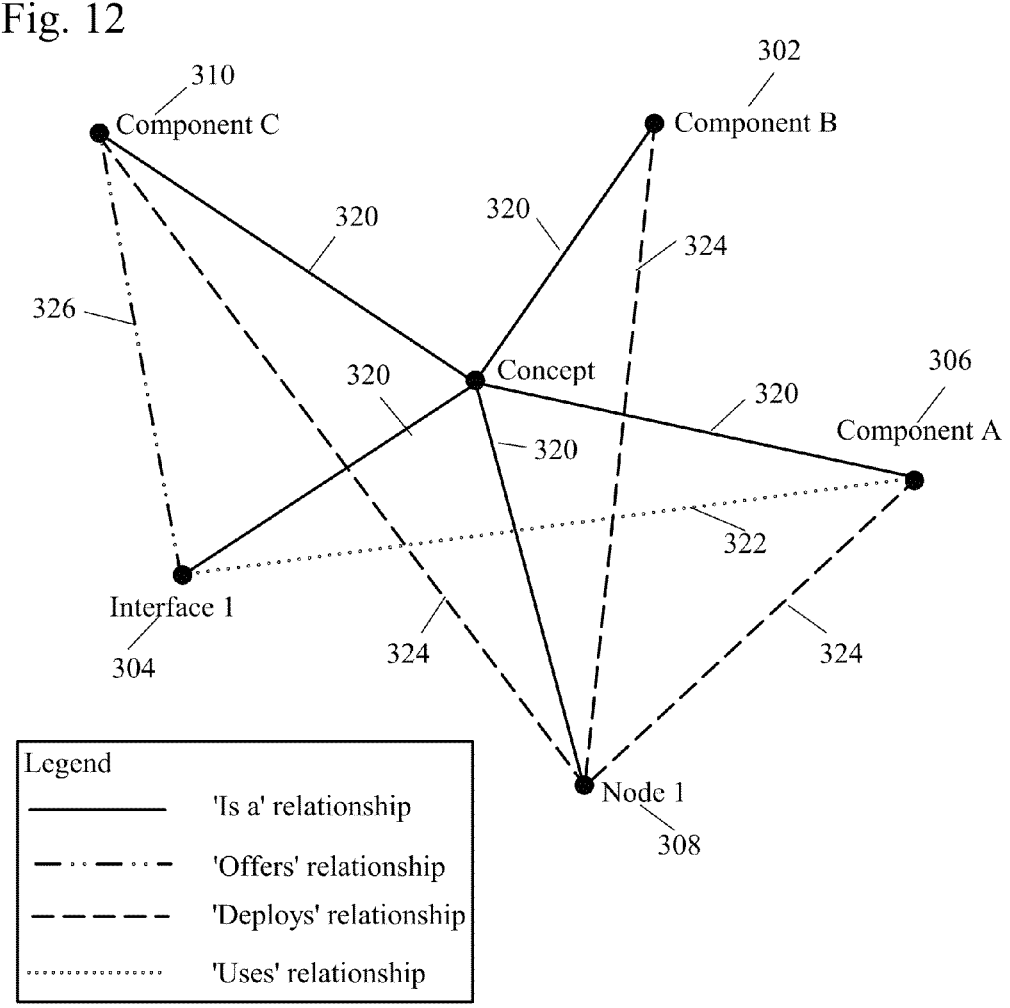
FIG. 12 shows an exemplary OWL/RDF representation of the UML legacy environment model in a second temporal scope.

FIG. 12 shows an exemplary graphical OWL representation of the temporal scope topic map of the UML model corresponding to the second temporal scope shown in FIG. 11. As shown, a relationship 'is' present between a Concept and Component A 306, Component B 302, Node1 308, Interface1 304 and Component C 310, indicated by the solid line 320. Interface1 304 'uses' Component A 306 as indicated by the dotted line 322. Node1 308 'deploys' Component C 310, Component B 302, and Component A 306 as indicated by the dashed line 324. Interface1 304 'offers' Component B 302 as indicated by the dash-dot-dot lines 326.

As discussed above, the semantic web RDF repository allows for versioning and merging of asset-requirement topic maps. With versioning and merging of asset-requirement topic maps, topic maps may be built by different domain experts and organized in conceptual spaces according to meaning.

For example, a domain expert could build up an asset—requirements topic map in an information service space of the SOA and another domain expert could build an assets-requirements topic map in an integration services space of the SOA. Both maps could then be easily merged together to provide multiple view on the topic map based on the role of whom is using them. A user would only need to see the relevant subset of the asset-requirement topic map to help understand what particular assets are relevant to his requirements. An asset requirements domain expert would only see the relevant services topic map for his domain. An asset-requirements topic map administrator would be able to see and navigate the entire map and create new association types of new topic types. More specifically, a legacy application asset domain expert could build up in a series of time dependent snap shots topic maps of a legacy application asset environment (e.g. all legacy application assets in a particular insurance company and how those legacy applications changed over time.) A user interested in a historical perspective would only see the relevant subset of legacy applications assets topic map to help understand what particular assets existed at a particular point in time.

By providing an implementation for converting the SOA IMR topic map meta-model to a semantic representation, the standards based query language of SPARQL Protocol and RDF Query Language (SPARQL) may be used to query the SOA IMR topic map meta-model. SPARQL allows for very fast querying, and will scale to millions of data items. Another advantage is that the requirement maps are maintained and information is kept up to date. By using a standards based query language, search and query requirement maps may be used to understand the suitable industry model assets or combinations of assets to be used for a particular set of requirements. Querying of relevant information about a particular model asset can be carried out using the standard based query language, such as where the particular model asset can be found and what assets the particular model asset can be used in conjunction with new information. The new information may be associations between assets that can be uncovered using inference technology such as semantic web based query languages, for example, SPARQL, to provide answers to queries across the asset-requirements topic maps. The selection of an RDF based repository like Sesame provides support for the kind of querying to determine that all of the assets can be used to satisfy a particular requirement or temporal scope, even though some assets do not have explicit relationships with the requirement.

FIGS. 13-17 show examples of searching and browsing the repository after the resource description framework triples specific to temporal scope have been persisted into the repository (step 506 of FIG. 6). Referring to FIG. 13, a user, such as user 108 of FIG. 1, may browse the repository, such as repository 103 of FIG. 1, through an interface, such as interface 107 of FIG. 1, and choose to focus on the association types by selecting http://www.owl-ontologies.com/unnames.owl#AssociationType. The association types present are shown in FIG. 14. The user, such as user 108 of FIG. 1, may then further narrow their scope by focusing on offers by selecting http://www.ibm.com/imr#offers. As shown in FIG. 15, the user, such as user 108 of FIG. 1, through the interface, such as interface 107 of FIG. 1, is presented all of the 'offers' relationships present. In this example, there are two such relationships, an 'offers 3' and an 'offers 5' relationship, each representing a different temporal scope. If the user 108 were to examine 'offers 3' by choosing http://www/ibm.com/imr#1_offers_3, the user, such as user 108 of FIG. 1, can examine all of the association and relationships that only exist in this specific temporal scope as shown in FIG. 16. For this example, 'offers 3' corresponds to first temporal scope as discussed above. Alternatively, the user, such as 108 of FIG. 1 may examine all of the associations and relationships that exist in 'offers 5' or in this specific temporal scope by choosing http://www.ibm.com/imr#1_offers_5 as shown in FIG. 17. For this example, 'offers 5' corresponds to the second temporal scope as discussed above.

By using semantic web technologies of the World Wide Web Consortium (W3C), such as OWL and RDF a user has the OWL capabilities and tools for expressing constraints, doing constraint checking and automated reasoning/inference, and for querying and visualization of ontology. In addition using semantic web technologies for converting the SOA IMR topic map meta-model to an OWL-DL representation also has many additional benefits. Using semantic web technology allows the complex model-model, model requirement, and requirement-requirement associations both abstract and instance data to be expressed mathematically in the form of triples (subject, predicate) which may be continuously checked for consistency to ensure the integrity of the data. Automatic tools can be used for consistency checking Additional constrains can also be introduced depending on the particular industry model. Since the semantic web technologies are mathematically based, inference of the data can be performed to identify new associations. By using standard XML based technologies of the World Wide Web Consortium (W3C) such as OWL and RDF, a variety of tools such as security can be leveraged. Controlled access to the topic maps, maps or subsection of the maps is supported using the family of XML security based standards.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for managing implementation of a service oriented architecture, the method comprising the steps of:
    based in part on a topic map meta-model of the service oriented architecture repository, a computer determining a first scope of time as a first time period representing a snap shot of a first state of the topic map meta-model during which a first condition exists for a computer component in the service oriented architecture;
    the computer assigning topics, occurrences of the topics and attributes of the topics of the topic map meta-model of the service oriented architecture repository which occur within the first scope of time to a first topic map meta-model to represent the first state of the topic map meta-model present within the first scope of time;
    the computer determining a second scope of time as a second time period representing a snap shot of a second state of the topic map meta-model during which a second, different condition exists for the computer component in the service oriented architecture;
    the computer assigning topics, occurrences of the topics and attributes of the topics of the topic map meta-model of the service oriented architecture repository which occur within the second, subsequent scope of time to a second topic map meta-model to represent the second state of the topic map meta-model present within the second scope of time;
    the computer mathematically converting data describing each combination of the topics, occurrences, and attributes within the first topic map meta-model representing the first state of the topic map meta-model present within the first scope of time into a corresponding first topic map meta-model resource description framework triples comprising a subject, a predicate and an object;
    the computer mathematically converting data describing each combination of the topics, occurrences and attributes within the second topic map meta-model representing the second state of the topic map meta-model present within the second scope of time into a corresponding second topic map meta-model resource description framework triples comprising a subject, a predicate and an object; and
    the computer receiving a request from a user for a topic map meta-model resource description framework triples within a scope of time specified in the request, and in response, the computer identifying and returning to the user the first topic map meta-model resource description framework triples or the second topic map meta-model resource description framework triples which complies with the specified scope of time.

2. The method of claim 1, wherein the steps of the computer mathematically converting data describing each combination of the topics, occurrences, and attributes within the first topic map meta-model representing the first state of the topic map meta-model present within the first scope of time into the corresponding first topic map meta-model resource description framework triples and the computer mathematically converting data describing each combination of the topics, occurrences, and attributes within the second topic map meta-model representing the second state of the topic map meta-model present within the second scope of time into the corresponding second topic map meta-model resource description framework triples further comprises the steps of:
    creating uniform resource identifiers for the topics of the first topic map meta-model and the second topic map meta-model;
    creating topic resource description framework triples of the topics of the first topic map meta-model and the second topic map meta-model;
    adding the topic resource description framework triples for the topics of the first topic map meta-model and the second topic map meta-model to a resource description framework repository;
    creating topic occurrence resource description framework triples for occurrences of the topics of the first topic map meta-model and the second topic map meta-model; and
    creating topic attribute resource description framework triples for attributes of the topics of the first topic map meta-model and the second topic map meta-models.

3. The method of claim 2, wherein the steps of the computer mathematically converting data describing each combination of the topics, occurrences, and attributes within the first topic map meta-model representing the first state of the topic map meta-model present within the first scope of time into the corresponding first topic map meta-model resource description framework triples and the computer mathematically converting the data describing each combination of the topics, occurrences, and attributes within the second topic map meta-model representing the second state of the topic map meta-model present within the second scope of time into the corresponding second topic map meta-model resource description framework triples further comprises the steps of getting a handle to the resource description framework repository; and obtaining a connection to the resource description framework repository.

4. The method of claim 2, wherein the step of creating topic occurrence resource description framework triples for occurrences of the topics of the first topic map meta-model and the second topic map meta-model further comprises:
  reading occurrences of the topics of the first topic map meta-model and the second topic map meta-model;
  creating topic occurrence resource description framework triples;
  adding the topic occurrence resource description framework triples to the resource description framework repository; and
  checking for other occurrences of the topics in the first topic map meta-model and the second topic map meta-model.

5. The method of claim 2, wherein the step of creating topic attribute resource description framework triples for attributes of the topics of the first topic map meta-model and the second topic map meta-model further comprises:
  reading attributes of the topics of the first topic map meta-model and the second topic map meta-model;
  creating topic attribute resource description framework triples;
  adding the topic attribute resource description framework triples to the resource description framework repository; and
  checking for other attributes of the topics in the first topic map meta-model and the second topic map meta-model.

6. The method of claim 1, further comprising, prior to the steps of claim 1, accepting an input indicating that the service oriented architecture repository has temporal dependent relationships, accepting an input identifying the temporal dependent relationships within the service oriented architecture repository and removing the temporal dependent relationships from the service oriented architecture repository.

7. The method of claim 1, wherein the computer checks the respective resource description framework triples for consistency to ensure data integrity of the first topic map meta-model and the second topic map meta-model.

8. The method of claim 1, wherein the computer searches the respective resource description framework triples to identify new associations between topics.

9. A computer program product for managing implementation of a service oriented architecture repository, the computer product comprising:
  a non-transitory computer readable storage media storing a plurality of computer readable program instructions to:
  based in part on a topic map meta-model of the service oriented architecture repository, determine a first scope of time as a first time period representing a snap shot of a first state of the topic map meta-model during which a first condition exists for a computer component in the service oriented architecture;
  assign topics, occurrences of the topics, and attributes of the topics of the topic map meta-model of the service oriented architecture repository which occur within the first scope of time to a first topic map meta-model to represent the first state of the topic map meta-model present within the first scope of time;
  determine a second scope of time as a second time period representing a snap shot of a second state of the topic map meta-model during which a second, different condition exists for the computer component in the service oriented architecture;
  assign topics, occurrences of the topics and attributes of the topics of the topic map meta-model of the service oriented architecture repository which occur within the second, subsequent scope of time to a second topic map meta-model to represent the second state of the topic map meta-model present within the second scope of time;
  mathematically convert data describing each combination of the topics, occurrences, and attributes within the first topic map meta-model representing the first state of the topic map meta-model present within the first scope of time into a respective resource description triples comprising a subject, a predicate and an object;
  mathematically convert data describing each combination of the topics, occurrences and attributes within the second topic map meta-model representing the second state of the topic map meta-model present within the second scope of time into a corresponding second topic map meta-model resource description framework triples comprising a subject, a predicate and an object; and
  receive a request from a user for a topic map meta-model resource description framework triples within a scope of time specified in the request, and in response, identify and return to the user the first topic map meta-model resource description framework triples or the second topic map meta-model resource description framework triples which complies with the specified scope of time.

10. The computer program product of claim 9, wherein the program instructions, to mathematically convert data describing each combination of the topics, occurrences, and attributes within the first topic map meta-model representing the first state of the topic map meta-model present within the first scope of time into the corresponding first topic map meta-model resource description framework triples and to mathematically convert data describing each combination of the topics, occurrences and attributes within the second topic map meta-model representing the second state of the topic map meta-model present within the second scope of time into the corresponding second topic map meta-model resource description framework triples, further comprises program instructions to:
  create uniform resource identifiers for the topics of the first topic map meta-model and the second topic map meta-model;
  create topic resource description framework triples for the topics of the first topic map meta-model and the second topic map meta-model;
  add the topic resource description framework triples for the topics of the first topic map meta-model and the second topic map meta-model to a resource description framework repository;
  create topic occurrence resource description framework triples for occurrences of the topics of the first topic map meta-model and the second topic map meta-model; and
  create topic attribute resource description framework triples for attributes of the topics of the first topic map meta-model and the second topic map meta-model.

11. The computer program product of claim 10, wherein the program instructions, to create topic occurrence resource description framework triples for occurrences of the topics of the first topic map meta-model and the second topic map meta-model further comprises program instructions to:

read occurrences of the topics of the first topic map meta-models and the second topic map meta-model;

create topic occurrence resource description framework triples;

add the topic occurrence resource description framework triples to the resource description framework repository; and check for other occurrences of the topics in the first topic map meta-model and the second topic map meta-model.

12. The computer program product of claim 10, wherein the program instructions, to create topic attribute resource description framework triples for attributes of the topics of the first topic map meta-model and the second topic map meta-model, further comprises program instructions to:

read attributes of the topics of the first topic map meta-model and the second topic map meta-model;

create topic attribute resource description framework triples;

add the topic attribute resource description framework triples to the resource description framework repository; and check for other attributes of the topics in the first topic map meta-model and the second topic map meta-model.

13. The computer program product of claim 9, in which the non-transitory computer readable storage media further stores a plurality of computer readable program instructions to:

accept an input indicating that the service oriented architecture repository has temporal dependent relationships;

accept an input identifying the temporal dependent relationships within the service oriented architecture repository; and remove the temporal dependent relationships from the service oriented architecture repository.

14. The computer program product of claim 9, further comprising program instructions to check the respective resource description framework triples for consistency to ensure data integrity of the first topic map meta-model and the second topic map meta-model.

15. The computer program product of claim 9, further comprising program instructions to search the respective resource description framework triples to identify new associations between topics.

16. A computer system for managing implementation of a service oriented architecture repository, the computer system comprising:

one or more processors, one or more computer-readable memories and one or more computer-readable, tangible storage devices;

program instructions, stored on at least one of the one or more storage devices for execution by at least one of the one or more processors via at least one of the one or more memories, to based in part on a topic map meta-model of the service oriented architecture repository, determine a first scope of time as a first time period representing a snap shot of a first state of the topic map meta-model during which a first condition exists for a computer component in the service oriented architecture;

program instructions, stored on at least one of the one or more storage devices for execution by at least one of the one or more processors via at least one of the one or more memories, to assign topics, occurrences of the topics, and attributes of the topics of the topic map meta-model of the service oriented architecture repository which occur within the first scope of time to a first topic map meta-model to represent the first state of the topic map meta-model present within the first scope of time;

program instructions, stored on at least one of the one or more storage devices for execution by at least one of the one or more processors via at least one of the one or more memories, to determine a second scope of time as a second time period representing a snap shot of a second state of the topic map meta-model during which a second, different condition exists for the computer component in the service oriented architecture;

program instructions, stored on at least one of the one or more storage devices for execution by at least one of the one or more processors via at least one of the one or more memories, to assign topics, occurrences of the topics and attributes of the topics of the topic map meta-model of the service oriented architecture repository which occur within a second, subsequent scope of time to a second topic map meta-model to represent the second state of the topic map meta-model present within the second scope of time;

program instructions, stored on at least one of the one or more storage devices for execution by at least one of the one or more processors via at least one of the one or more memories, to mathematically convert data describing each combination of the topics, occurrences, and attributes within the first topic map meta-model representing the first state of the topic map meta-model present within the first scope of time into a respective resource description framework triples comprising a subject, a predicate and an object;

program instructions, stored on at least one of the one or more storage devices for execution by at least one of the one or more processors via at least one of the one or more memories, to mathematically convert data describing each combination of the topics, occurrences and attributes within the second topic map meta-model representing the second state of the topic map meta-model present within the second scope of time into a corresponding second topic map meta-model resource description framework triples comprising a subject, a predicate and an object; and program instructions, stored on at least one of the one or more storage devices for execution by at least one of the one or more processors via at least one of the one or more memories, to receive a request from a user for a topic map meta-model resource description framework triples within a scope of time specified in the request, and in response, identify and return to the user the first topic map meta-model resource description framework triples or the second topic map meta-model resource description framework triples which complies with the specified scope of time.

17. The computer system of claim 16, wherein the program instructions, to mathematically convert data describing each combination of the topics, occurrences, and attributes within the first topic map meta-model representing the first state of the topic map meta-model present within the first scope of time into the corresponding first topic map meta-model resource description framework triples and to mathematically convert data describing each combination of the topics, occurrences and attributes within the second topic map meta-model representing the second state of the topic map meta-model present within the second scope of time into the corresponding second topic map meta-model resource description framework triples, further comprises program instructions to:

create uniform resource identifiers for the topics of the first topic map meta-model and the second topic map meta-model;

create topic resource description framework triples for the topics of the plurality of temporal scope topic map meta-models, first topic map meta-model and the second topic map meta-model;

add the topic resource description framework triples for the topics of the first topic map meta-model and the second topic map meta-model to a resource description framework repository;

create topic occurrence resource description framework triples for occurrences of the topics of the first topic map meta-model and the second topic map meta-model; and create topic attribute resource description framework triples for attributes of the topics of the first topic map meta-model and the second topic map meta-model.

18. The computer system of claim 17, wherein the program instructions, to mathematically convert the data describing each combination of the topics, occurrences, and attributes from within the first topic map meta-model representing the first state of the topic map meta-model present within the first scope of time into the corresponding first topic map meta-model resource description framework triples and to mathematically convert the data describing each combination of the topics, occurrences, and attributes within the second topic map meta-model representing the second state of the topic map meta-model present within the second scope of time into the corresponding second topic map meta-model resource description framework triples further comprises program instructions to get a handle to the resource description framework repository and obtain a connection to the resource description framework repository.

19. The computer system of claim 17, wherein the program instructions, to create topic occurrence resource description framework triples for occurrences of the topics of the first topic map meta-model and the second topic map meta-model further comprises program instructions to:

read occurrences of the topics of the first topic map meta-model and the second topic map meta-model;

create topic occurrence resource description framework triples;

add the topic occurrence resource description framework triples to the resource description framework repository; and check for other occurrences of the topics of the first topic map meta-model and the second topic map meta-model.

20. The computer system of claim 17, wherein the program instructions to create topic attribute resource description framework triples for attributes of the topics of the first topic map meta-model and the second topic map meta-model further comprising program instructions to:

read attributes of the topics of the first topic map meta-model and the second topic map meta-model;

create topic attribute resource description framework triples; and add the topic attribute resource description framework triples to the resource description framework repository.

21. The computer system of claim 16, further comprising:

program instructions, stored on at least one of the one or more storage devices for execution by at least one of the one or more processors via at least one of the one or more memories, to accept an input indicating that the service oriented architecture repository has temporal dependent relationships;

program instructions, stored on at least one of the one or more storage devices for execution by at least one of the one or more processors via at least one of the one or more memories, to accept an input identifying the temporal dependent relationships within the service oriented architecture repository; and program instructions, stored on at least one of the one or more storage devices for execution by at least one of the one or more processors via at least one of the one or more memories, to remove the temporal dependent relationships from the service oriented architecture repository.

22. The computer system of claim 16, further comprising program instructions to check the respective resource description framework triples for consistency to ensure data integrity of the first topic map meta-model and the second topic map meta-model.

23. The computer system of claim 16, further comprising program instructions to search the respective resource description framework triples to identify new associations between topics.

* * * * *